US012271969B2

(12) United States Patent
Donoghue et al.

(10) Patent No.: US 12,271,969 B2
(45) Date of Patent: Apr. 8, 2025

(54) PERSONAL PROTECTIVE EQUIPMENT TRAINING SYSTEM WITH USER-SPECIFIC AUGMENTED REALITY CONTENT CONSTRUCTION AND RENDERING

(71) Applicant: 3M INNOVATIVE PROPERTIES COMPANY, St. Paul, MN (US)

(72) Inventors: Claire R. Donoghue, Reading (GB); Christopher P. Henderson, Cumbria (GB); Benjamin W. Watson, Hampshire (GB); Caroline M. Ylitalo, Stillwater, MN (US); Gautam Singh, Woodbury, MN (US); Alexandra R. Cunliffe, St. Paul, MN (US); Deepti Pachauri, Minneapolis, MN (US); Jonathan D. Gandrud, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 25 days.

(21) Appl. No.: 17/998,820

(22) PCT Filed: May 5, 2021

(86) PCT No.: PCT/IB2021/053806
§ 371 (c)(1),
(2) Date: Nov. 15, 2022

(87) PCT Pub. No.: WO2021/229372
PCT Pub. Date: Nov. 18, 2021

(65) Prior Publication Data
US 2023/0343040 A1 Oct. 26, 2023

Related U.S. Application Data

(60) Provisional application No. 63/025,378, filed on May 15, 2020.

(51) Int. Cl.
*G06T 13/40* (2011.01)
*A62B 27/00* (2006.01)
(Continued)

(52) U.S. Cl.
CPC ............. *G06Q 50/20* (2013.01); *A62B 27/00* (2013.01); *G06T 13/40* (2013.01); *G06T 19/006* (2013.01);
(Continued)

(58) Field of Classification Search
CPC ....... G06T 13/40; G06T 19/006; G06T 19/20; G06T 2219/2004; G06T 2219/2016;
(Continued)

(56) References Cited

U.S. PATENT DOCUMENTS 6,545,309 B1 4/2003 Kuo
6,546,309 B1 4/2003 Gazzuolo
(Continued)

FOREIGN PATENT DOCUMENTS

WO 2016000304 W 1/2016
WO 2019166952 A1 9/2019
(Continued)

OTHER PUBLICATIONS

Davis, "Combating the COVID-19 crisis with interactive safety training for healthcare workers", [retrieved on Jul. 1, 2021], URL: <https:/blog.unity.com/manufacturing/combatting-the-covid-19-crisis-with-interactive-safety-training-for-healthcare>, 2020, pp. 1-7.
(Continued)

*Primary Examiner* — Antonio A Caschera

(57) ABSTRACT

Augmented reality-based training systems that can dynamically construct and render AR content based on physical attributes of a user to train the user to correctly fit one or more articles of a personal protective equipment (PPE) onto the user's body. In some examples, an AR system includes
(Continued)

a display and a computing device having a memory and one or more processors. The memory can include instructions that, when executed by the processors, simulate a fitting of PPE to a worker. The system can capture an image of a worker, select a digital model of the PPE, determine alignment of the PPE to the worker, and output for display augmented reality content that includes a composite image of the worker overlaid with the digital model of the PPE in accordance with the determined alignment.

18 Claims, 11 Drawing Sheets

(51) Int. Cl.
*G06Q 50/20* (2012.01)
*G06T 19/00* (2011.01)
*G06T 19/20* (2011.01)
*G06V 10/50* (2022.01)
*G06V 10/82* (2022.01)
*G06V 20/20* (2022.01)
*G06V 40/16* (2022.01)

(52) U.S. Cl.
CPC .............. *G06T 19/20* (2013.01); *G06V 10/50* (2022.01); *G06V 10/82* (2022.01); *G06V 20/20* (2022.01); *G06V 40/161* (2022.01); *G06V 40/171* (2022.01); *G06T 2219/2004* (2013.01); *G06T 2219/2016* (2013.01)

(58) Field of Classification Search
CPC ...... G06V 20/20; G06V 40/171; G06V 10/82; G06V 40/161; G06V 10/50; A62B 27/00
See application file for complete search history.

(56) References Cited

U.S. PATENT DOCUMENTS

| | | | |
|---|---|---|---|
| 10,777,018 B2 * | 9/2020 | Varady | ...................... G06T 7/62 |
| 11,748,983 B2 * | 9/2023 | Donoghue | ............. G06V 10/44 |
| | | | 382/103 |
| 2001/0026351 A1 | 10/2001 | Gao et al. | |
| 2010/0177981 A1 | 7/2010 | Wang et al. | |
| 2014/0278320 A1 * | 9/2014 | Wang | ...................... G06F 30/20 |
| | | | 703/11 |
| 2016/0133022 A1 | 5/2016 | Sarkis et al. | |
| 2016/0180587 A1 | 6/2016 | Bai et al. | |
| 2019/0180085 A1 | 6/2019 | Wen | |

FOREIGN PATENT DOCUMENTS

| | | |
|---|---|---|
| WO | 2019224659 A1 | 11/2019 |
| WO | 2019224665 A1 | 11/2019 |

OTHER PUBLICATIONS

International Search report for PCT International Application No. PCT/IB2021/053806 mailed on Aug. 5, 2021, 3 pages.
Wolbrink, "Donning and Doffing Personal Protective Equipment", OPENPediatrics, 2020, pp. 1-2.

* cited by examiner

PERSONAL PROTECTIVE EQUIPMENT TRAINING SYSTEM WITH USER-SPECIFIC AUGMENTED REALITY CONTENT CONSTRUCTION AND RENDERING

CROSS REFERENCE TO RELATED APPLICATIONS

This application is a national stage filing under 35 U.S.C. 371 of PCT/IB2021/053806, filed May 5, 2021, which claims the benefit of U.S. Provisional Application No. 63/025,378, filed May 15, 2020, the disclosure of which is incorporated by reference in its/their entirety herein.

TECHNICAL FIELD

The present disclosure relates to the field of personal protective equipment.

BACKGROUND

In some examples, a worker may be required to wear one or more articles of personal protective equipment (PPE) while performing a certain job function, working in a specific work environment, or the like. For example, a worker may be required to wear at least one of respiratory-protection equipment, protective eyewear, protective headwear, hearing-protection devices, protective shoes, protective gloves, protective clothing, or any other article of PPE.

SUMMARY

The disclosure describes devices, systems, and techniques relating to a personal protective equipment (PPE) training system that utilizes dynamically customized and constructed augmented-reality (AR) content to train a user to correctly fit one or more articles of PPE onto the user's body. The PPE training system is configured to automatically generate AR content that is both user-specific and PPE-specific, such that a graphical representation (e.g., a digital model) of one or more specific articles of PPE is uniquely positioned and/or oriented according to user-specific features (e.g., facial and/or body landmarks, profiles or other attributes) extracted from images of the user in order to provide a highly accurate simulation of a correct or proper fit of the PPE to the particular user.

In some examples, a PPE training system may capture at least one image of the user and overlay the image with augmented-reality content to simulate the user correctly fitting the one or more articles of PPE. The user may then perform actions to mirror the augmented reality simulation to correctly fit the one or more articles of PPE on their own body. In some examples, the system may also be configured to verify, based on image data, that the worker is correctly wearing the one or more articles of PPE. In such examples, the system may generate for output a message or alert if one or more articles of PPE is incorrectly worn, enabling the user to correct the mistake prior to beginning a job function and/or entering a work environment. In turn, the user may be empowered to ensure that they are correctly fit with the one or more articles of PPE. Thus, the devices, systems, and techniques described herein may improve the safety, health, accountability, and/or compliance of a worker.

In one example, a personal protective equipment (PPE) training system includes an image capture device and a computing device communicatively coupled to the image capture device, the computing device comprising one or more computer processors and a memory, the memory including instructions that when executed by the one or more computer processors cause the one or more computer processors to simulate a fitting of a personal protective equipment (PPE) article to a worker by: controlling the image capture device to capture at least a first image of the worker; selecting a digital model of the PPE article; determining an alignment of the digital model of the PPE article to the first image of the worker; and outputting for display augmented reality content comprising a composite of a least a second image of the worker overlaid with the digital model of the PPE article in accordance with the determined alignment.

In another example, a method includes controlling an image capture device to capture at least a first image of a worker; selecting a digital model of a PPE article; determining an alignment of the digital model of the PPE article to the first image of the worker; and outputting for display augmented reality content comprising a composite of a least a second image of the worker overlaid with the digital model of the PPE article in accordance with the determined alignment.

In yet another example, a computing device includes a display; a memory; and one or more processors coupled to the memory and the display, wherein the memory comprises instructions that, when executed by the one or more processors: control an image capture device to capture at least a first image of a worker; select a digital model of a PPE article; determine an alignment of the digital model of the PPE article to the first image of the worker; and output for display augmented reality content comprising a composite of a least a second image of the worker overlaid with the digital model of the PPE article in accordance with the determined alignment.

The details of one or more examples of the disclosure are set forth in the accompanying drawings and the description below. Other features, objects, and advantages of the disclosure will be apparent from the description and drawings, and from the claims.

DETAILED DESCRIPTION

Figure 1:
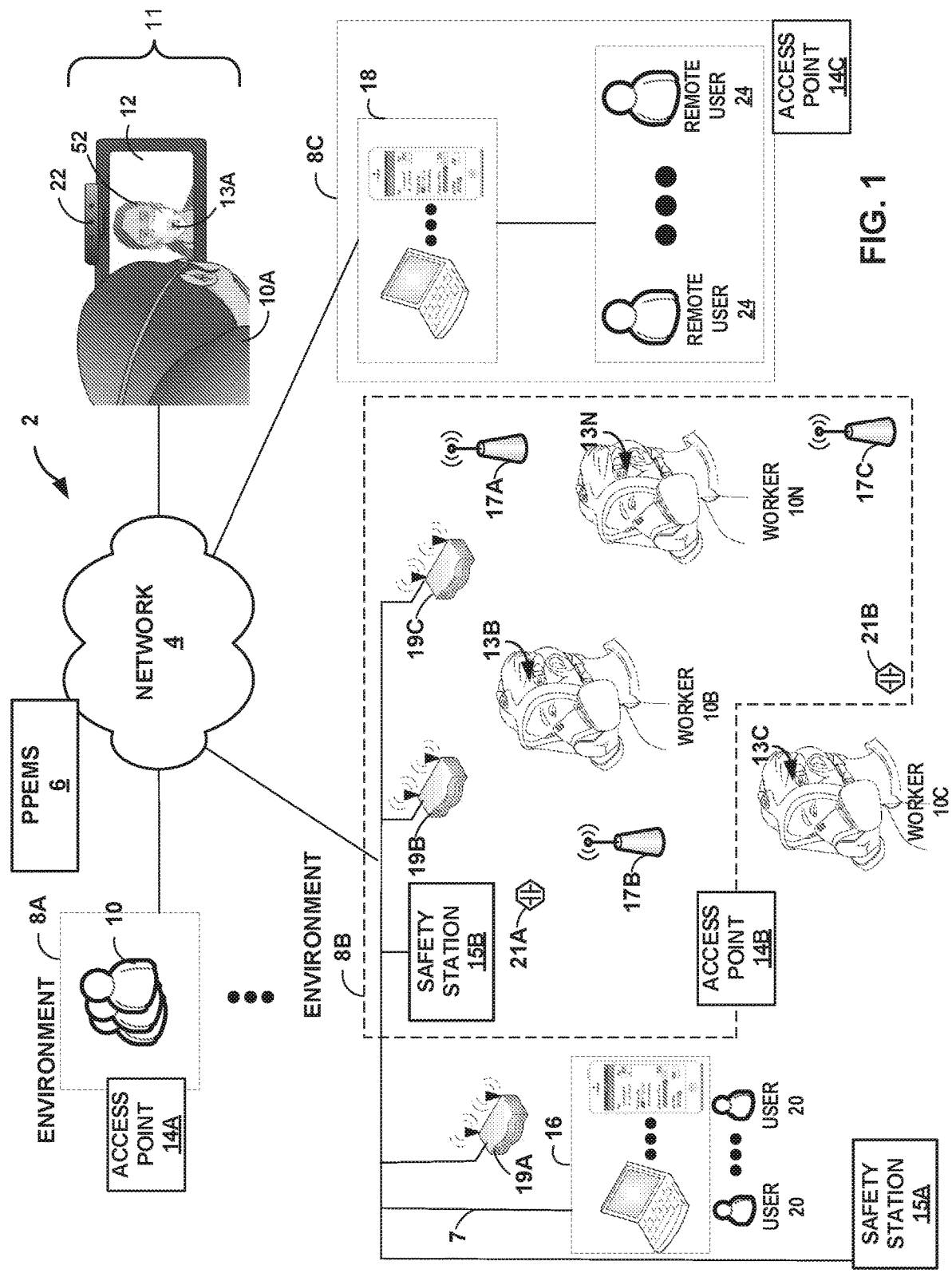
FIG. 1 is a block diagram illustrating an example system that includes an augmented reality-based personal protective equipment (PPE) training system, in accordance with some techniques of this disclosure.

In general, a worker in a work environment may be exposed to various hazards or safety events (e.g., air contamination, heat, falls, etc.). Regulations may require the worker to wear one or more articles of personal protective equipment (PPE) to protect the worker from these hazards and safety events. The present disclosure describes articles, systems, and methods that enable dynamic generation and presentation of a worker-specific augmented-reality (AR)-based PPE training simulation demonstrating a correct fit of one or more articles of PPE designed to protect the worker against such hazards or safety events.

In some examples, an AR-based PPE training system executing on a computing device may provide an interactive training sequence that guides a user of the system (e.g., a worker) through a simulation of the user properly fitting one or more articles of PPE onto himself, in order to help the user fit the one or more articles correctly. For example, the AR-based training system may capture an image or video of the user and overlay the image or video with augmented-reality content to simulate the user correctly fitting the one or more articles of PPE. The user may then be instructed to mirror the augmented reality content to correctly fit actual physical PPs corresponding to the one or more simulated articles of PPE. In some examples, the AR-based training system may also be configured to process images and/or video of the user verify so as to verify in real-time during the training simulation that the worker is correctly wearing the one or more articles of PPE. In such examples, the AR-based training system may present an alert if one or more articles of PPE is incorrectly worn, enabling the user to correct the mistake prior to beginning a job function and/or entering a work environment. In this way, the AR-based training may enable the user to ensure that he or she is equipped with the proper one or more articles of PPE. Thus, the devices, systems, and techniques described herein may improve the safety, health, accountability, and/or compliance of a worker.

The example AR-based training systems described herein may be used with a PPE management system and, in some examples, may be integrated with the PPE management system to improve worker safety and provide technical advantages over other systems by, for example, providing real-time education and evaluation of a worker's PPE compliance, relating to safety, compliance, potential hazards, or the like. By integrating with a PPE management system, the techniques may enable, for example, enhanced user-specific and PPE-specific AR information by simulating or mirroring the appearance of the user himself in relation to PPE compliance for particular articles of PPE, thereby increasing the user's attentiveness to, and interactions with, the simulation and/or retention of the information and techniques taught by the simulation. As another example, the articles, systems, and techniques described herein may help enable a PPE management system to, prior to the occurrence of a safety event, alert that corrective action need be taken. For instance, the AR-based training systems described herein may be able to identify PPE non-compliance before the worker begins a work task, and may communicate with a PPE management system to distribute messages, alerts and other communications to various devices operated by safety managers and other user within a work environment.

FIG. 1 is a block diagram illustrating an example computing system 2 that includes an augmented-reality (AR)-based personal protection equipment training system 11 for simulating and displaying a correct fit of one or more articles of PPE 13A-13N (collectively, "articles of PPE 13") for a worker 10 or other user. As described herein, AR-based PPE training system generates and outputs augmented reality (AR) content in a manner that is customized based on the physical attributes (e.g., physical landmarks or profiles or other attributes) of a given user and also based on attributes of a particular set of one or more articles of PPE. As described herein, AR-based training system 11 dynamically renders the AR content to demonstrate a correct "fit" for digital models of one or more articles of PPE overlaid on the particular worker at a particular position, orientation and scale based on the worker's particular physical attributes. AR-based PPE training system 11 may be used, for example, prior to the worker entering and/or performing a job function within a work environment 8A-8C (collectively, "environments 8"), which represent construction sites, mining, confined spaces, manufacturing sites, or any physical environment in which PPEs may be used.

As described herein, by interacting with AR-based PPE training system 11, workers can be educated how to correctly fit, wear, or don one or more articles of PPE that he or she should be equipped with and can confirm that they are properly prepared to enter environments 8. In some examples, AR-based PPE training system 11 may communicate with PPE management system (PPEMS) 6 so as to maintain training records that may subsequently be used to certify that a worker, such as workers 10A-10N (collectively, "workers 10"), has received training on correctly fitting one or more articles of PPE 13 that are required for entering work environments 8. In some examples, AR-based PPE training system 11 and PPEMS 6 may further be configured to verify that a PPE 13 currently being worn by a worker 10 is correctly fit on the worker prior to the worker entering the work environments via an access point 14A or 14B (collectively, "access points 14").

In some examples, AR-based PPE training system 11 may communicate with PPEMS 6 may operate to identify one or more articles of PPE for which a given worker is to be trained, generate and display user-specific AR content for training the user on the one or more articles of PPE, acquire data, monitor, log compliance, generate reports, provide in depth analytics, and generate alerts. For example, as further described below, PPEMS 6 includes an underlying analytics and alerting system in accordance with various examples described herein, which may be used to alert a worker or another user of one or more articles of PPE that are incorrectly fit to and/or or missing from a worker. In some examples, the underlying analytics and alerting system may be used to determine that a worker is wearing the proper size article of PPE, that the worker has been properly trained to use an article of PPE, that all the required articles of PPE are correctly worn by the worker, and/or that a confidence level of the determinations has been achieved.

In this way, AR-based PPE training system 11 and PPEMS 6 may provide an integrated suite of PPE determination tools and implements various techniques of this disclosure. That is, in some examples, AR-based PPE training system 11 and PPEMS 6 provide an integrated, end-to-end system for determining one or more articles of PPE that a worker 10A-10N is required to wear, providing an AR-based training simulation of a correct fit of the one or more articles of PPE, and/or for verifying a correct fit of one or more articles of PPE worn by workers 10 prior to allowing the worker to enter one or more environments 8.

As shown in the example of FIG. 1, system 2 represents a computing environment in which a computing device 16, 18 (e.g., at access point 14A or 14B, and/or within or proximate to a plurality of environments 8), may electronically communicate with PPEMS 6 via one or more computer networks 4. Each environment 8 represents a physical environment, such as a work environment, in which one or more individuals, such as workers 10, utilize PPE while engaging in tasks or activities within the respective environment. As shown in FIG. 1, each of the environments 8 may have an access point 14 through which workers 10 and/or users 24 gain entrance into the environment 8.

In the example of FIG. 1, environment 8A is shown as generally having workers 10, while environment 8B is shown in expanded form to provide more detail. In the example of FIG. 1, a user 10A is shown wearing an article of PPE 13A, such as a mask. A plurality of workers 10B-10N are shown within environment 8B wearing respective articles of PPE 13B-13N. Remote users 24, which may be examples of workers 10, access computing device(s) 18 within environment 8C. Worker 10C is shown wearing a respective article of PPE 13C at access point 14B outside of environment 8B. As shown, for example, in FIG. 1, each worker 10 may wear a respirator as an article of PPE 13A-13N. In other examples, workers 10 may use one or more additional or alternative articles of PPE 13. In some cases, one or more articles of PPE 13 may be configured to transmit data from a sensor of the one or more articles of PPE 13 to network 4. For example, one or more articles of PPE 13 may be configured to transmit data relating to the usage, the useful life, the status, or the like of the one or more articles of PPE 13 to a device through network 4.

Each of environments 8 may include computing facilities (e.g., a local area network) by which one or more computing devices 16, 18 at access points 14 and/or within environments 8 are able to communicate with PPEMS 6. For example, access points 14 and/or environments 8 may be configured with wireless technology, such as 802.11 wireless networks, 802.15 ZigBee networks, or the like. In the example of FIG. 1, access point 14B and environment 8B include a local network 7 that provides a packet-based transport medium for communicating with PPEMS 6 via network 4. In addition, access point 14B and/or environment 8B may include a plurality of wireless access points 19A-19C geographically distributed throughout access point 14B and/or environment 8B to provide support for wireless communications both inside and outside of access point 14B and/or work environment 8B.

As shown in the example of FIG. 1, an environment, such as environment 8B, may also include one or more wireless-enabled beacons, such as beacons 17A-17C (collectively, "beacons 17"), that provide accurate location information within the work environment. For example, beacons 17 may be GPS-enabled such that a controller within the respective beacon may be able to precisely determine the position of the respective beacon.

In addition, an environment, such as environment 8B, may also include one or more wireless-enabled sensing stations, such as sensing stations 21A and 21B (collectively, "sensing stations 21"). Each sensing station 21 includes one or more sensors and a controller configured to output data indicative of sensed environmental conditions. Moreover, sensing stations 21 may be positioned within respective geographic regions of environment 8B or may otherwise interact with beacons 17 to determine respective positions and may include such positional information when reporting environmental data to PPEMS 6. As such, PPEMS 6 may be configured to correlate the sensed environmental conditions with the particular regions. For example, PPEMS 6 may use the environmental data to aid when generating alerts or other instructions to workers 10 at access point 14B. For instance, PPEMS 6 may use such environmental data to inform workers 10 of environmental conditions he or she may experience upon entrance to work environment 8B. Example environmental conditions that may be sensed by sensing stations 21 include but are not limited to temperature, humidity, presence or absence of a gas, pressure, visibility, wind, or the like.

In general, physical access points 14 and/or environments 8 may include computing facilities that provide an operating environment for computing devices 16 to interact with PPEMS 6 via network 4. Similarly, remote users 24 may use computing devices 18 to interact with PPEMS 6 via network 4 from environment 8C. For example, access points 14 and/or environments 8 may include one or more safety managers responsible for overseeing safety compliance, such as PPE compliance of workers 10. In some such examples, remote users 24 may be able to access data acquired by PPEMS 6 such as, for example, PPE compliance information, training information, avatars of workers 10, images of workers 10, or any other data available to PPEMS 6 as described herein. In some examples, remote users 24 may include examples of workers 10 engaging in offsite PPE simulation training. Computing devices 16, 18 may include any suitable computing device, such as, for example, laptops, desktop computers, and/or mobile devices, such as tablets and/or smartphones, or the like. In some examples, access point 14B and/or environment 8B may also include one or more safety stations 15A, 15B (collectively, "safety stations 15") for accessing one or more articles of PPE 13, such as the respirators shown in FIG. 1. Safety stations 15 may allow workers 10 to check out one or more articles of PPE 13, exchange a size of one or more articles of PPE 13, exchange data, or the like. In some examples, safety stations 15 may transmit alerts, rules, software updates, and/or firmware updates to one or more articles of PPE 13.

In according with the techniques of this disclosure, AR-based training system 11 is configured to automatically generate a user-specific and PPE-specific PPE training simulation. In some examples, AR-based training system 11 may automatically identify one or more articles of PPE 13A for which worker 10A is to be trained. For example, AR-based training system 11 and/or PPEMS 6 may be configured to identify one or more articles of PPE 13A the worker 10A should don before entering environment 8B and, for those articles, determine whether worker 10A has received training as to the proper fit of those articles. This may occur, for example, when worker 10A is at access point 14B but should occur before worker 10A enters environment 8B. In some examples, the one or more articles of PPE 13A may be identified based on an identity of worker 10A. For example, AR-based training system 11 may receive identification information including at least one of an identification number, a username, biometric information, photo recognition information, or voice recognition information of worker 10A, and may use the received information to determine the identity of worker 10A. AR-based training system 11 may receive the identification information in any suitable manner. For example, AR-based training system 11 may receive the identification information from a worker 10A manually entering the identification information (e.g., using an input device on computing devices 16 or display 12), from a badge or identification card associated with worker 10A (e.g., using radio frequency identification, a barcode, a magnetic stripe, or the like), or by analyzing biometric information of worker 10A such as an image, a voice, a fingerprint, a retina, or the like, or through combinations thereof.

In some examples, AR-based training system 11 and/or PPEMS 6 may automatically identify the one or more articles of PPE 13A on which worker 10A is to be trained based on a job function of worker 10A. Based on the identified job function of worker 10A, AR-based training system 11 may select one or more articles of PPE for worker 10A to use for training from one or more default articles of PPE. The one or more default articles of PPE may include one or more articles of PPE required for the identified job function of worker 10A. In this way, AR-based training system 11 and/or PPEMS may automatically select the one or more articles of PPE 13A for which worker 10A is to be trained such that worker 10A will be properly educated as to the fit of the one or more articles of PPE 13A that are specific to the job function that worker 10A is scheduled to perform within environment 8B.

Additionally or alternatively, AR-based training system 11 may communicate with PPEMS 6 to identify the one or more articles of PPE 13A for worker 10A to use based on one or more articles of PPE that worker 10A is trained to use. For example, PPEMS 6 may select one or more articles of PPE for worker 10A is trained to use based on the determined identity of worker 10. In turn, worker 10A may use the one or more articles of PPE 13A as intended based on that training such that the one or more articles of PPE 13A can maintain the safety and/or health of worker 10A and/or prevent harm to worker 10A due to incorrect use of the one or more articles of PPE 13A.

In some cases, AR-based training system 11 may communicate with PPEMS 6 to identify the one or more articles of PPE 13A for worker 10A to use based on one or more previously worn articles of PPE. For example, the one or more previously worn articles of PPE 13 may include at least one of an article of PPE 13 previously worn by worker 10A, an article of PPE previously worn within environment 8B, or an article of PPE previously worn for a specific job function (e.g., an article of PPE previously worn for the job function to be performed by worker 10A in environment 8B). In some examples, worker 10A may select an article of PPE 13A to wear, via a user interface of computing devices 16, 18.

After determining one or more articles of PPE 13A via any of the above-recited methods, AR-based training system 11 is configured to generate and output an interactive, AR-based training sequence that provides a simulation of worker 10A wearing the determined articles of PPE 13A, where AR-based training system 11 automatically generates the AR-content specifically based on the particular set of PPEs determined for the user and also based on physical features of the particular user. For example, AR-based training system 11 includes camera 22 for capture images of the user to be used for determining physical attributes of the particular user. Camera 22 may include a two-dimensional RGB/IR camera, or in some examples, a three-dimensional depth camera. AR-based training system 11 is configured to cause image capture devices 22 to capture at least one image of worker 10A. The image may include a single still image, a series of images, or a video of worker 10A. The image(s) may capture a part of the body of worker 10A on which the article of PPE 13A is to be worn. For example, if the determined article of PPE includes a respirator mask 13A as shown in FIG. 1, image capture device 22 is configured to capture at least one image of the face of worker 10A.

Once image capture device 22 has captured at least one image of worker 10A, AR-based training system 11 is configured to generate augmented-reality content to simulate the determined article of PPE 13A being correctly worn on worker 10A. For simplicity, the rest of this disclosure is described with respect to an example in which AR-based training system 11 simulates a fit of a respirator mask 13A to the face of worker 10A, however, the techniques herein may similarly be applicable to other articles of PPE worn elsewhere on the body of worker 10A. For example, the techniques herein may be equally applicable to other PPE items such as a breathing protection device, a fall-protection device, a hearing protection device, an eye protection device, or a head protection device.

As detailed further below, AR-based training system 11 receives the at least one image of the face of worker 10A from image capture device 22 and processes the image to locate facial features of the worker. For example, AR-based training system 11 may apply face-detection software to the image of worker 10A to identify a series of facial landmarks or other feature points along an identified face of worker 10A. AR-based training system 11 may then use one or more algorithms to fit or otherwise align the identified facial landmarks with a digital model of the determined article of PPE 13A. For example AR-based training system 11 may translate, rotate, and/or scale either or both of the facial landmarks and/or the digital model of the determined article of PPE 13A, such that, for example, the identified facial landmarks approximately conform to a shape and/or surface of the digital model of PPE 13A. AR-based training system 11 may store an indication of the determined relative alignment, such as a relative orientation (e.g., translation and/or rotation) and/or a relative scale between the facial landmarks and the digital model.

Once PPEMS 6 has determined a relative alignment between the facial landmarks and the digital model of PPE 13A, AR-based training system 11 may generate AR content, such as a composite image 52, AR video, or animation based on the relative alignment. For example, AR-based training system 11 may overlay the captured image of worker 10A with a two-dimensional or three-dimensional graphical representation of the digital model of PPE 13A according to the alignment, and output the composite image 52 as a simulation of a correct fit of PPE 13A to the face of worker 10A. In other examples, AR-based training system 11 may overlay the captured image of worker 10A with an animation sequence depicting a correct procedure to done the article of PPE 13A, wherein the animation sequence terminates with the PPE 13A correctly fit to the image of worker 10A based on the determined alignment. In some examples, such as examples in which the captured image of worker 10A includes a real-time live video feed of the face of worker 10A, AR-based training system 11 may continuously update and output the AR content such that the AR content remains correctly aligned to the face of worker 10A within the live video feed, even as the worker moves or turns his or her face.

In other examples, rather than outputting a composite image including the originally captured image of worker 10A, AR-based training system 11 may be configured to generate and display a moving (e.g., animated) avatar of worker 10A that is correctly fit with the one or more articles of PPE 13A for worker 10A to use. Systems and techniques for avatars equipped with PPE are described in further detail in commonly assigned U.S. Provisional Patent Application No. 62/637,255, incorporated herein by reference in its entirety. For example, AR-based training system 11 may periodically or continuously capture images of worker 10A (e.g., using image capture device 22). AR-based training system 11 may compare a first image to a second image, in which the first image was captured at an earlier time than the second image and determine a movement of worker 10A based on the comparison of the first and second images. If a movement of worker 10A is determined, AR-based training system 11 may display a moving avatar of worker 10A that mirrors the determined movement of worker 10A. In this way, AR-based training system 11 may display a moving avatar of worker 10A such that what is shown on display 12 serves as an intelligent or smart mirror reflecting a moving image of worker 10A as worker 10A moves. Worker 10A in turn, may move his or her body to mirror the AR animations or other instructions demonstrated in the AR content in order to follow the procedure for correctly donning the articles of PPE 13A.

In some examples, AR-based training system 11 may be further configured to verify whether the one or more articles of PPE 13A worn by worker 10A are correctly fit or worn. For example, AR-based training system 11 may capture a subsequent image of worker 10A using image capture device 22, and may analyze the captured image of worker 10A to identify one or more articles of PPE 13A worn by the worker in the image. AR-based training system 11 may compare a current alignment of the one or more articles of PPE 13A worn by worker 10A in the image to the previously determined alignment of worker 10A with the digital model of PPE 13A. For example, AR-based training system 11 may determine whether a current alignment of PPE 13A is within a threshold amount of the previously determined alignment. If the current alignment is outside the threshold amount, AR-based training system 11 may output for display an indication of the correct alignment, as well as further AR content simulating a procedure to correct the alignment.

In this way, verification that the one or more articles of PPE worn by worker 10A in the image correspond to the determined alignment may help ensure that worker 10A is correctly equipped with the one or more articles of PPE 13A required for a job function and/or within environment 8, and that worker 10A is correctly wearing one or more articles of PPE that are the proper size, or the like, which may improve the safety, health, accountability, and/or compliance of worker 10A.

Figure 2:
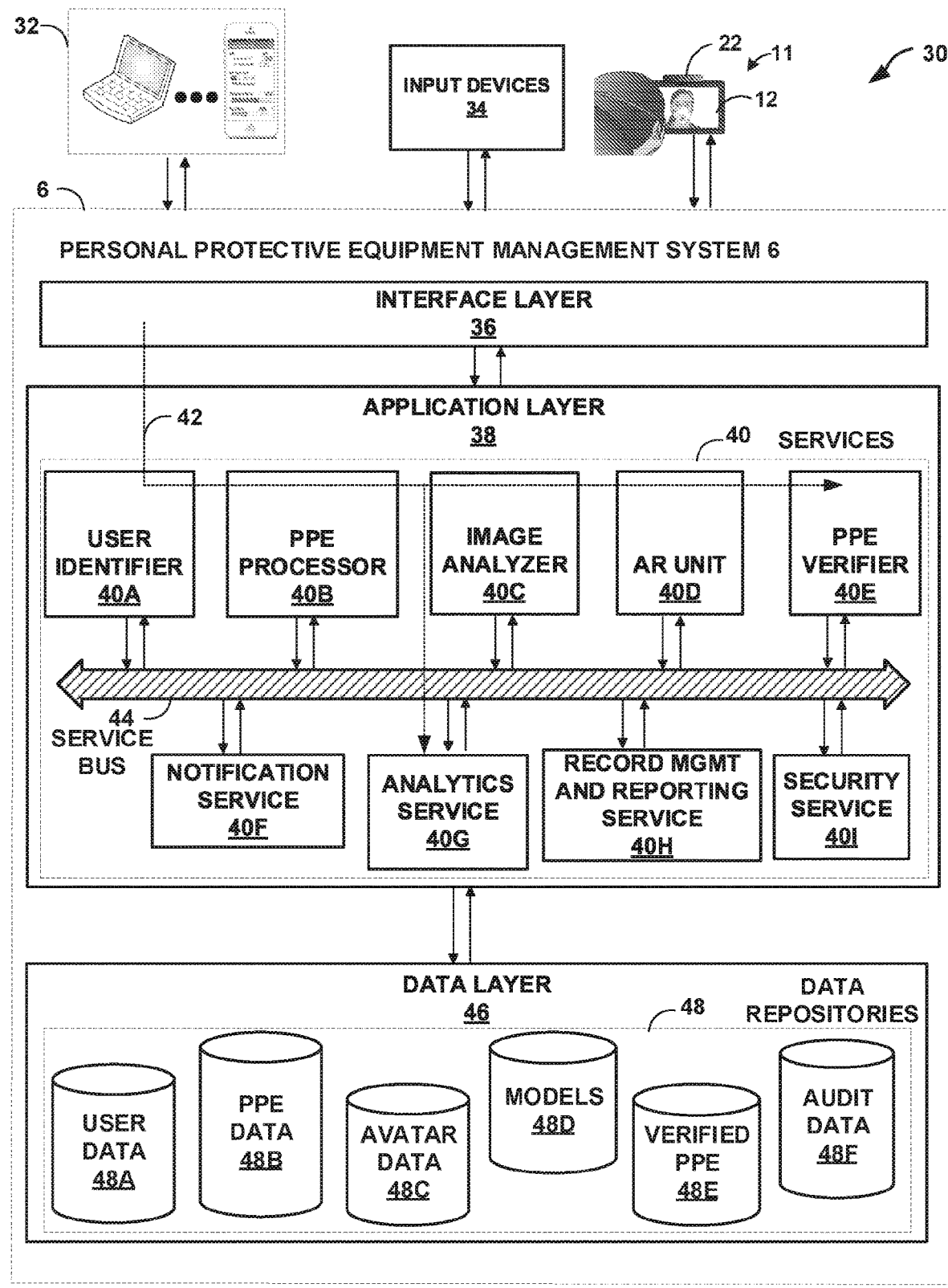
FIG. 2 is a block diagram providing an operating perspective of the system of FIG. 1 when the AR-based training system interacts with a cloud-based PPE management system to provide enhanced AR content and training on a user-specific and PPE-specific basis.

As further described with respect to FIG. 2, in some examples, AR-based training system 11 communicates with PPEMS 6, which integrates a processing platform configured to process thousand or even millions of concurrent streams of compliance and/or verification information from one or more access points 14. An underlying analytics engine of PPEMS 6 may apply historical data and models to the inbound streams to compute confidence levels, identify trends or patterns, apply machine learning algorithms, or the like. PEMS 6 may also be configured to process streams of information relating to environments 8, such as, for example, environmental conditions and/or safety events of environments 8. Further, PPEMS 6 may provide real-time alerting and reporting to notify workers 10 and/or users 20, 24 of any compliance errors, verification information, low confidence levels, anomalous conditions of environments 8, or the like. In this way, PPEMS 6 tightly integrates comprehensive tools for managing PPE compliance with an underlying analytics engine and communication system to provide data acquisition, monitoring, activity logging, reporting, behavior analytics, and/or alert generation. Moreover, PPEMS 6 provides a communication system for operation and utilization by and between the various elements of system 2.

FIG. 2 is a block diagram providing an operating perspective of an example in which AR-based training system 11 is in communication with PPEMS 6 implemented as a cloud-based platform capable of supporting multiple, distinct access points 14 and/or work environments 8 having an overall population of workers 10 that are required to wear one or more articles of PPE. Although described with respect to the example of FIG. 2, the functionality and components of PPEMS 6 may be distributed between the PPEMS and AR-based training system 11. Moreover, in some examples, AR-based training system 11 may be configured to operates as a standalone device incorporating some or all of the functions described with respect to PPEMS 6 in the example of FIG. 2.

In the example of FIG. 2, the components of PPEMS 6 are arranged according to multiple logical layers that implement the techniques of the disclosure. Each layer may be implemented by one or more modules and may include hardware, software, or a combination of hardware and software.

In some example approaches, computing devices 32, display 12, input devices 34, and/or safety stations 15 operate as clients 30 that communicate with PPEMS 6 via interface layer 36. Computing devices 32 typically execute client software applications, such as desktop applications, mobile applications, and/or web applications. Computing devices 32 may represent any of computing devices 16, 18 of FIG. 1. Examples of computing devices 32 may include, but are not limited to, a portable or mobile computing device (e.g., smartphone, wearable computing device, tablet), laptop computers, desktop computers, smart television platforms, and/or servers.

In some example approaches, computing devices 32, display 12, cameras 22, input devices 34 and/or AR-based training system 11 may communicate with PPEMS 6 to send and receive information related to articles of PPE identified for a worker, AR-content generation, PPE verification, alert generation, or the like. Client applications executing on computing devices 32 and AR-based training system 11 may communicate with PPEMS 6 to send and receive information that is retrieved, stored, generated, and/or otherwise processed by services 40. For example, the client applications may request and edit PPE digital models, PPE compliance information, avatars, PPE training and/or sizing information, or any other information described herein including analytical data stored at and/or managed by PPEMS 6. In some examples, client applications may request and display information generated by PPEMS 6, such AR content simulating a worker equipped with one or more determined articles of PPE and/or verification of one or more articles of PPE worn by worker 10A in an image. In addition, the client applications may interact with PPEMS 6 to query for analytics information about PPE compliance, behavior trends of workers 10, audit information, or the like. The client applications may output for display information received from PPEMS 6 to visualize such information for users of clients 30. As further illustrated and described below, PPEMS 6 may provide information to the client applications, which the client applications output for display in user interfaces.

Client applications executing on computing devices 32 and/or AR-based training system 11 may be implemented for different platforms but include similar or the same functionality. For instance, a client application may be a desktop application compiled to run on a desktop operating system, such as Microsoft Windows, Apple OS X, or Linux, to name only a few examples. As another example, a client application may be a mobile application compiled to run on a mobile operating system, such as Google Android, Apple iOS, Microsoft Windows Mobile, or BlackBerry OS to name only a few examples. As another example, a client application may be a web application such as a web browser that displays web pages received from PPEMS 6. In the example of a web application, PPEMS 6 may receive requests from the web application (e.g., the web browser), process the requests, and send one or more responses back to the web application. In this way, the collection of web pages, the client-side processing web application, and the server-side processing performed by PPEMS 6 collectively provides the functionality to perform techniques of this disclosure. In this way, client applications use various services of PPEMS 6 in accordance with techniques of this disclosure, and the applications may operate within different computing environments (e.g., a desktop operating system, mobile operating system, web browser, or other processors or processing circuitry, to name only a few examples).

As shown in FIG. 2, in some example approaches, PPEMS 6 includes an interface layer 36 that represents a set of application programming interfaces (API) or protocol interface presented and supported by PPEMS 6. Interface layer 36 initially receives messages from any of clients 30 for further processing at PPEMS 6. Interface layer 36 may therefore provide one or more interfaces that are available to client applications executing on clients 30. In some examples, the interfaces may be application programming interfaces (APIs) that are accessible over network 4. In some example approaches, interface layer 36 may be implemented with one or more web servers. The one or more web servers may receive incoming requests, may process, and/or may forward information from the requests to services 40, and may provide one or more responses, based on information received from services 40, to the client application that initially sent the request. In some examples, the one or more web servers that implement interface layer 36 may include a runtime environment to deploy program logic that provides the one or more interfaces. As further described below, each service may provide a group of one or more interfaces that are accessible via interface layer 36.

In some examples, interface layer 36 may provide Representational State Transfer (RESTful) interfaces that use HTTP methods to interact with services and manipulate resources of PPEMS 6. In such examples, services 40 may generate JavaScript Object Notation (JSON) messages that interface layer 36 sends back to the client application that submitted the initial request. In some examples, interface layer 36 provides web services using Simple Object Access Protocol (SOAP) to process requests from client applications. In still other examples, interface layer 36 may use Remote Procedure Calls (RPC) to process requests from clients 30. Upon receiving a request from a client application to use one or more services 40, interface layer 36 sends the information to application layer 38, which includes services 40.

As shown in FIG. 2, PPEMS 6 also includes an application layer 38 that represents a collection of services for implementing much of the underlying operations of PPEMS 6. Application layer 38 receives information included in requests received from client applications that are forwarded by interface layer 36 and processes the information received according to one or more of services 40 invoked by the requests. Application layer 38 may be implemented as one or more discrete software services executing on one or more application servers, e.g., physical or virtual machines. That is, the application servers provide runtime environments for execution of services 40. In some examples, the functionality of interface layer 36 as described above and the functionality of application layer 38 may be implemented at the same server.

Application layer 38 may include one or more separate software services 40 (e.g., processes) that may communicate via, for example, a logical service bus 44. Service bus 44 generally represents a logical interconnection or set of interfaces that allows different services to send messages to other services, such as by a publish/subscription communication model. For example, each of services 40 may subscribe to specific types of messages based on criteria set for the respective service. When a service publishes a message of a particular type on service bus 44, other services that subscribe to messages of that type will receive the message. In this way, each of services 40 may communicate information to one another. As another example, services 40 may communicate in point-to-point fashion using sockets or other communication mechanisms. Before describing the functionality of each of services 40, the layers are briefly described herein.

Data layer 46 of PPEMS 6 represents a data repository 48 that provides persistence for information in PPEMS 6 using one or more data repositories 48 (for example, data repositories 48A, 48B, 48C, 48D, 48E, and 48F as shown in FIG. 2). A data repository, generally, may be any data structure or software that stores and/or manages data. Examples of data repositories include but are not limited to relational databases, multi-dimensional databases, maps, and/or hash tables. Data layer 46 may be implemented using Relational Database Management System (RDBMS) software to manage information in data repositories 48. The RDBMS software may manage one or more data repositories 48, which may be accessed using Structured Query Language (SQL). Information in the one or more databases may be stored, retrieved, and modified using the RDBMS software. In some examples, data layer 46 may be implemented using an Object Database Management System (ODBMS), Online Analytical Processing (OLAP) database, or any other suitable data management system.

As shown in FIG. 2, each of services 40A-40I is implemented in a modular form within PPEMS 6. Although shown as separate modules for each service, in some examples the functionality of two or more services may be combined into a single module or component. Each of services 40 may be implemented in software, hardware, or a combination of hardware and software. Moreover, services 40 may be implemented as standalone devices, separate virtual machines or containers, processes, threads, or software instructions generally for execution on one or more physical processors or processing circuitry.

In some examples, one or more of services 40 may each provide one or more interfaces 42 that are exposed through interface layer 36. Accordingly, client applications of computing devices 32 may call one or more interfaces 42 of one or more of services 40 to perform techniques of this disclosure.

In some cases, services 40 include a user identifier service 40A used to identify a worker 10A (FIG. 1). For example, user identifier service 40A may receive identification information from a client 30, such as an input device 34, and may read information stored in user data repository 48A to identify worker 10A based on the identification information. In some examples, user data repository 48A may include identification information including at least one of what worker 10A knows (e.g., an identification number password or username), what worker 10A has (e.g., an identity card or token) and what the user is (a physical characteristic of worker 10A such as biometric information, photo recognition information, or voice recognition information of worker 10A). User identifier 40A may receive at least one of such identification information, and may read user data repository 48A to identify worker 10A based on the received identification information.

In some examples, user identifier 40A may process the received identification information to include identification information in the same form as the identification information stored in user data repository 48A. For example, user identifier 40A may analyze an image, a retina, a fingerprint, and/or a voice recording of worker 10A to extract data and/or information from the identification information that is included in user data repository 48A. As one example, user identifier 40A may extract data representative of a pattern of a fingerprint of worker 10A to compare to data stored in user data repository 48A.

PPE processor 40B identifies one or more articles of PPE 13A for worker 10A to use. For example, as described herein, PPE processor 40B may identify the one or more articles of PPE 13A for worker 10A to use based on an identity of worker 10A, such as based on a job function of worker 10A, environment 8B, based on one or more articles of PPE that worker 10A is trained to use, based on one or more previously worn articles of PPE (e.g., one or more of articles of PPE previously worn by worker 10A, previously worn within environment 8B, or previously worn for a specific job function), based on user input from worker 10A (e.g., a selection from a list or menu), or the like. PPE processor 40B may read such information from PPE data repository 48B. For example, PPE data repository 48B may include data relating to PPE required for various job functions, PPE required for various environments 8, articles of PPE that various workers 10 have been trained to use, and/or PPE previously worn for a job function, in an environment 8, or by a worker 10A. PPE data repository 48B may also include information pertaining to various sizes of one or more articles of PPE for workers 10. For example, PPE data repository 48B may include the brand, model, and/or size of one or more articles of PPE for workers 10 based on fit testing of workers 10. In some examples, in addition to, or as an alternative to, PPE data repository 48B, user data repository 48A may include information regarding a job function of worker 10A, environment 8B within which worker 10A is to work, PPE previously worn by worker 10A, fit testing data of worker 10A, or the like.

PPE processor 40B may further create, update, and/or delete information stored in PPE data repository 48B and/or in user data repository 48A. For example, PPE processor 40B may update PPE data repository 48B or user data repository 48A after a worker 10 undergoes training for one or more articles of PPE, or PPE processor 40B may delete information in PPE data repository 48B or in user data repository 48A if a worker 10 has outdated training on one or more articles of PPE. In other examples, PPE processor 40B may create, update, and/or delete information stored in PPE data repository 48B and/or in user data repository 48A due to additional or alternative reasons.

Moreover, in some examples, such as in the example of FIG. 2, a safety manager may initially configure one or more safety rules pertaining to articles of PPE that workers 10 should use. As such, remote user 24 may provide one or more user inputs at computing device 18 that configure a set of safety rules relating to articles of PPE. For example, a computing device 32 of the safety manager may send a message that defines or specifies the one or more articles of PPE required for a specific job function, for a specific environment 8, for a specific worker 10A, or the like. Such messages may include data to select or create conditions and actions of the safety rules. PPEMS 6 may receive the message at interface layer 36 which forwards the message to PPE processor 40B, which may additionally be configured to provide a user interface to specify conditions and actions of rules, receive, organize, store, and update rules included in PPE data repository 48B, such as safety rules relating to PPE that workers 10 should use in various cases.

In some examples, storing the safety rules may include associating a safety rule with context data, such that PPE processor 40B may perform a lookup to select safety rules associated with matching context data. Context data may include any data describing or characterizing the properties or operation of a worker, worker environment, article of PPE, or any other entity. Context data of a worker may include, but is not limited to, a unique identifier of a worker, type of worker, role of worker, physiological or biometric properties of a worker, experience of a worker, training of a worker, time worked by a worker over a particular time interval, location of the worker, or any other data that describes or characterizes a worker. Context data of an article of PPE 13 may include, but is not limited to, a unique identifier of the article of PPE; a type of PPE of the article of PPE; a usage time of the article of PPE over a particular time interval; a lifetime of the PPE; a component included within the article of PPE; a usage history across multiple users of the article of PPE; contaminants, hazards, or other physical conditions detected by the PPE, expiration date of the article of PPE; operating metrics of the article of PPE; size of the PPE; or any other data that describes or characterizes an article of PPE. Context data for a work environment may include, but is not limited to, a location of a work environment, a boundary or perimeter of a work environment, an area of a work environment, hazards within a work environment, physical conditions of a work environment, permits for a work environment, equipment within a work environment, owner of a work environment, responsible supervisor and/or safety manager for a work environment; or any other data that describes or characterizes a work environment. In some examples, the context data may be the same, or close to the same, as the information used to identify the one or more articles of PPE for worker 10A to use.

Image analyzer 40C analyzes one or more images of worker 10, such as captured by camera 22. For example, as detailed further with respect to FIGS. 5A-5C below, image analyzer 40D may analyze one or more images of worker 10A to identify a face of worker 10. Upon identifying a face of worker 10, image analyzer 40C may extract facial landmarks from the image. Image analyzer 40C may also be able to identify details about a worker 10 and/or an article of PPE worn by the worker 10 in the image from the one or more images. For example, image analyzer 40C may be able to identify a brand, a model, a size, or the like of an article of PPE worn by the worker 10 in the one or more analyzed images and/or identify at least one of hair color, eye color, height, weight, facial features, skin tone, or attire of a worker 10 in the one or more images. The identified details may be saved in at least one of user data repository 48A or PPE data repository 48, may be sent to PPE verifier 40F for verification of the one or more articles of PPE worn by worker 10A in the one or more images, or combinations thereof. Image analyzer 40C may further create, update, and/or delete information stored in user data repository 48A and/or in PPE data repository 48B

AR unit 40D is configured to generate and output for display augmented reality content simulating a correct fit of an article of PPE to an image of a worker 10. For example, AR unit 40D may receive a set of extracted facial landmarks from image analyzer 40C, and a model of an article of PPE from models repository 48D, and aligns or determines a best fit of the facial landmarks to the digital model of the article of PPE. For example, AR unit 40D may rotate, translate, and or scale the facial landmarks and/or the PPE model in order to reduce an error between the facial landmarks and at least one shape or surface of the PPE model. AR unit 40D may then generate and output AR content based on the determined alignment, such as a composite image of worker 10 overlaid with the PPE model or a related animation according to the determined alignment.

PPE verifier 40E verifies that worker 10A is correctly fit with an article of PPE (e.g., the same one or more articles of PPE identified for worker 10A to use by PPE processor 40B). In some examples, PPE verifier 40E may compare the one or more articles of PPE worn by worker 10A in an image (e.g., as identified by image analyzer 40C) and a determined correct alignment, e.g., as determined by AR unit 40D). Based on the comparison, PPE verifier 40E may determine whether worker 10A is correctly wearing all identified articles of PPE, whether the articles of PPE worn by worker 10A in the image are the proper size for worker 10A, whether worker 10A is trained to use the articles of PPE worn by worker 10A in the image, or the like.

In some examples, PPE verifier 40E may cause AR unit 40D and/or notification service 40F to highlight or otherwise indicate one or more errors with respect to the one or more articles of PPE worn by worker 10A in the image. In some cases, PPE verifier 40E may highlight or otherwise indicate one or more articles of PPE that are not correctly aligned to worker 10A in the image, that are the incorrect size for worker 10A, that worker 10A is not trained to use, or combinations thereof. PPE verifier 40E may highlight or otherwise indicate different errors in different ways such that worker 10A can differentiate between errors when two or more types of errors are present. For example, PPE verifier 40E may highlight an incorrect fit of PPE in a first color or pattern, may highlight an article of PPE that is incorrect in size using a second color or pattern, may highlight an article of PPE that worker 10A has not been trained to use using a third color or pattern. In other examples, indications other than colored and/or patterned highlighted articles of PPE may be used to indicate the one or more errors of the articles of PPE worn by worker 10A in the image. Determination of an error with respect to the one or more articles of PPE worn by worker 10A in the image may result in notification service 40F generating an alert indicating the error in addition to, or as an alternative to, PPE verifier 40D causing AR unit 40D to indicate the error via AR content.

In some examples, PPE verifier 40E may read, create, update, and/or delete information stored in verified PPE repository 48E. For example, verified PPE repository 48E may include the PPE identified as worn by worker 10A in an image by image analyzer 40D, one or more avatars modified to indicate missing and/or incorrect articles of PPE worn by worker 10A in the image, one or more captured images of worker 10A used to verify the one or more articles of PPE worn by worker 10A in the image, or the like. In other examples, the data that would be stored in verified PPE repository 48E may be stored in one or more other data stores. For example, identified PPE data may be stored in PPE data repository 48B and/or in user data repository 48A.

In some examples, analytics service 40G performs in depth processing of the one or more identified articles of PPE for workers 10, one or more images, one or more articles of PPE identified as worn by a worker in an image, or the like. Such in depth processing may enable analytics service 40G to determine PPE compliance of workers 10, such as PPE compliance for workers entering environment 8 via a specific access point 14, PPE compliance of individual workers 10, more accurately identify the one or more articles of PPE worn by worker 10A in images, or the like.

In some cases, analytics service 40G performs in depth processing in real-time to provide real-time alerting and/or reporting. In this way, analytics service 40G may be configured as an active safety management system that provides real-time alerting and reporting to a safety manager, a supervisor, or the like in the case of PPE non-compliance of a worker 10. This may enable the safety manager and/or supervisor to intervene in the PPE non-compliance of the worker 10 such that worker 10 is not at risk for harm, injury, health complications, or combinations thereof due to a lack of PPE compliance.

In addition, analytics service 40G may include a decision support system that provides techniques for processing data to generate assertions in the form of statistics, conclusions, and/or recommendations. For example, analytics service 40G may apply historical data and/or models stored in models repository 48D to determine the accuracy of the fit or alignment of one or more articles of PPE worn by worker 10A in the image determined by image analyzer 40D. In some such examples, analytics service 40G may calculate a confidence level relating to the identification accuracy of one or more articles of PPE worn by worker 10A in the image. As one example, in the case in which lighting conditions of access point 14B may be reduced, the confidence level calculated by analytics service 40G may be lower than a confidence level calculated when lighting conditions are not reduced. If the calculated confidence level is less than or equal to a threshold confidence level, notification service 40F may present an alert on display 12 to notify worker 10A that the results of the PPE verification may not be completely accurate. Hence, analytics service 40G may maintain or otherwise use one or more models that provide statistical assessments of the accuracy of the identification of the one or more articles of PPE required and/or worn by a worker in an image. In one example approach, such models are stored in models repository 48D.

Analytics service 40G may also generate order sets, recommendations, and quality measures. In some examples, analytics service 40G may generate user interfaces based on processing information stored by PPEMS 6 to provide actionable information to any of clients 30. For example, analytics service 40G may generate dashboards, alert notifications, reports and the like for output at any of clients 30. Such information may provide various insights regarding baseline ("normal") PPE compliance across worker populations, identifications of any anomalous workers engaging in PPE non-compliance that may potentially expose the worker to risks, identifications of any of access points 14B exhibiting anomalous occurrences of PPE non-compliance relative to other environments, or the like.

Moreover, in addition to non-compliance, analytics service 40G may use in-depth processes to more accurately identify and/or verify the fit of one or more articles of PPE. For example, although other technologies can be used, analytics service 40G may utilize machine learning when processing data in depth. That is, analytics service 40G may include executable code generated by application of machine learning to PPE identification, image analyzing, PPE verification, PPE compliance, or the like. The executable code may take the form of software instructions or rule sets and is generally referred to as a model that can subsequently be applied to data generated by or received by PPEMS 6 for detecting similar patterns, identifying the one or more articles of PPE, analyzing images, verifying the fit of one or more articles of PPE, or the like.

Analytics service 40G may, in some examples, generate separate models for each worker 10A, for a particular population of workers 10, for a particular access point 14, for a combination of one or more articles of PPE, for a type of PPE, for a brand, model, and/or size of PPE, for a specific job function, or for combinations thereof, and store the models in models repository 48D. Analytics service 40G may update the models based on PPE compliance data, images, and/or PPE verification. For example, analytics service 40G may update the models for each worker 10A, for a particular population of workers 10, for a particular access point 14, for a combination of one or more articles of PPE, for a type of PPE, for a brand, model, and/or size of PPE, for a specific job function, or for combinations thereof based on data received from camera 22, input devices 34, and/or any other component of PPEMS 6, and may store the updated models in models repository 48D. Analytics service 40G may also update the models based on statistical analysis performed, such as the calculation of confidence intervals, and may store the updated models in models repository 48D.

Example machine learning techniques that may be employed to generate models can include various learning styles, such as supervised learning, unsupervised learning, and semi-supervised learning. Example types of algorithms include Bayesian algorithms, Clustering algorithms, decision-tree algorithms, regularization algorithms, regression algorithms, instance-based algorithms, artificial neural network algorithms, deep learning algorithms, dimensionality reduction algorithms, or the like. Various examples of specific algorithms include Bayesian Linear Regression, Boosted Decision Tree Regression, and Neural Network Regression, Back Propagation Neural Networks, the Apriori algorithm, K-Means Clustering, k-Nearest Neighbour (kNN), Learning Vector Quantization (LVQ), Self-Organizing Map (SOM), Locally Weighted Learning (LWL), Ridge Regression, Least Absolute Shrinkage and Selection Operator (LASSO), Elastic Net, Least-Angle Regression (LARS), Principal Component Analysis (PCA), and/or Principal Component Regression (PCR).

In some examples, analytics service 40G may provide comparative ratings of PPE compliance of workers 10. For example, analytics service 40G may "gamify" the PPE compliance of workers 10. In other words, in some cases, analytics service 40G may reward points to workers 10 for PPE compliance, which may increase worker morale and/or increase the desire of workers 10 to comply with PPE policies and regulations.

Record management and reporting service 40H processes and responds to messages and queries received from computing devices 32 via interface layer 36. For example, record management and reporting service 40H may receive requests from client computing devices for event data related to individual workers, populations or sample sets of workers, and/or access points 14. In response, record management and reporting service 40H accesses information based on the request. Upon retrieving the data, record management and reporting service 40H constructs an output response to the client application that initially requested the information. In some examples, the data may be included in a document, such as an HTML document, or the data may be encoded in a JSON format or presented by a dashboard application executing on the requesting client computing device.

As additional examples, record management and reporting service 40H may receive requests to find, analyze, and correlate PPE compliance information. For instance, record management and reporting service 40H may receive a query request from a client application for verified PPE stored in repository 48E over a historical time frame, such that a user can view PPE compliance information over a time and/or a computing device can analyze the PPE compliance information over time.

In some examples, services 40 may also include security service 40I that authenticates and authorizes users and requests with PPEMS 6. Specifically, security service 40I may receive authentication requests from client applications and/or other services 40 to access data in data layer 46 and/or perform processing in application layer 38. An authentication request may include credentials, such as a username and password. Security service 40I may query user data repository 48A to determine whether the username and password combination is valid. User data repository 48A may include security data in the form of authorization credentials, policies, and any other information for controlling access to PPEMS 6. As described above, user data repository 48A may include authorization credentials, such as combinations of valid usernames and passwords for authorized users of PPEMS 6. Other credentials may include device identifiers or device profiles that are allowed to access PPEMS 6.

Security service 40I may provide audit and logging functionality for operations performed at PPEMS 6. For instance, security service 40I may log operations performed by services 40 and/or data accessed by services 40 in data layer 46. Security service 40I may store audit information such as logged operations, accessed data, and rule processing results in audit data repository 48F. In some examples, security service 40I may generate events in response to one or more rules being satisfied. Security service 40I may store data indicating the events in audit data repository 48F.

Although generally described herein as "PPE models," any or all of fit-procedure animations, AR content, avatars, images, rendered articles of PPE, or any other stored information described herein may be stored in data repositories 48. In some examples, data repositories 48 may additionally or alternatively include data representing such PPE models, fit-procedure animations, avatars, images, rendered articles of PPE, or any other stored information described herein. As one example, encoded lists, vectors, or the like representing a previously stored PPE model may be stored in addition to, or as an alternative, the previously stored PPE model itself. In some examples, such data representing PPE models, animations, avatars, images, rendered articles of PPE, or any other stored information described herein may be simpler to store, evaluate, organize, categorize, or the like in comparison to storage of the actual PPE models, animations, avatars, images, rendered articles of PPE, or the like.

In general, while certain techniques or functions are described herein as being performed by certain components or modules, it should be understood that the techniques of this disclosure are not limited in this way. That is, certain techniques described herein may be performed by one or more of the components or modules of the described systems. Determinations regarding which components are responsible for performing techniques may be based, for example, on processing costs, financial costs, power consumption, or the like.

Figure 3:
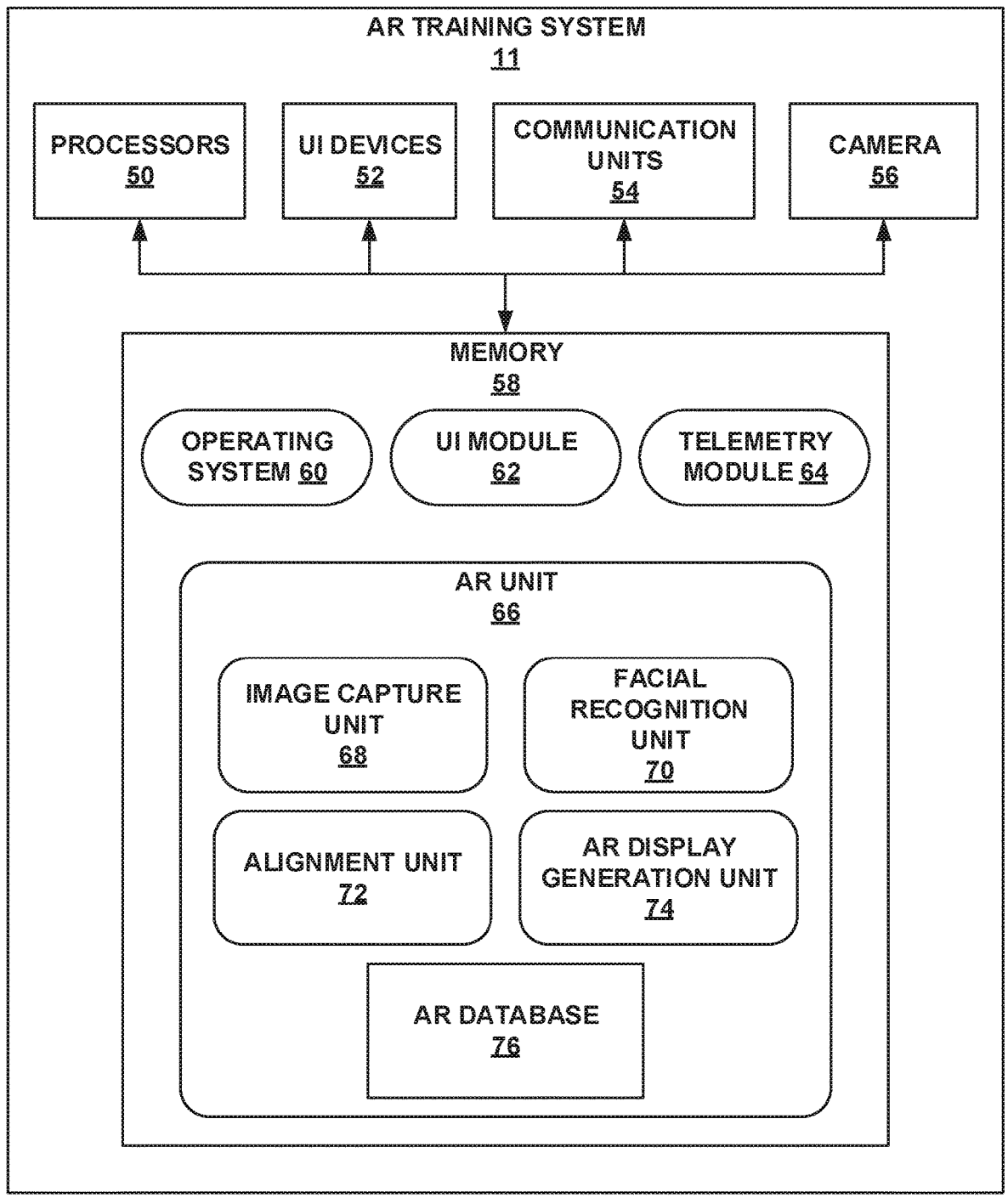
FIG. 3 is a conceptual block diagram illustrating an example AR-based PPE training system, in accordance with various techniques of this disclosure.

FIG. 3 is a conceptual block diagram illustrating an example of an augmented reality (AR) training system 11 configured to present an AR-based PPE training simulation, in accordance with various techniques of this disclosure. The architecture of AR-based training system 11 illustrated in FIG. 3 is shown for exemplary purposes only and AR-based training system 11 should not be limited to this architecture. In other examples, AR-based training system 11 may be configured in a variety of ways. In some examples, AR-based training system 11 may be an example of computing devices 16 or 18 of FIG. 1 or computing devices 32 of FIG. 2.

As shown in the example of FIG. 3, AR-based training system 11 includes one or more processors 50, one or more user interface (UI) devices 52, one or more communication units 54, a camera 56, and one or more memory units 58. Memory 58 of AR-based training system 11 includes operating system 60, UI module 62, telemetry module 64, and AR unit 66, which are executable by processors 50. Each of the components, units, or modules of AR-based training system 11 are coupled (physically, communicatively, and/or operatively) using communication channels for inter-component communications. In some examples, the communication channels may include a system bus, a network connection, an inter-process communication data structure, or any other method for communicating data.

Processors 50, in one example, may include one or more processors that are configured to implement functionality and/or process instructions for execution within AR-based training system 11. For example, processors 50 may be capable of processing instructions stored by memory 58. Processors 50 may include, for example, microprocessors, DSPs, ASICs, FPGAs, or equivalent discrete or integrated logic circuitry, or a combination of any of the foregoing devices or circuitry.

Memory 58 may be configured to store information within AR-based training system 11 during operation. Memory 58 may include a computer-readable storage medium or computer-readable storage device. In some examples, memory 58 includes one or more of a short-term memory or a long-term memory. Memory 58 may include, for example, RAM, DRAM, SRAM, magnetic discs, optical discs, flash memories, or forms of EPROM, or EEPROM. In some examples, memory 58 is used to store program instructions for execution by processors 50. Memory 58 may be used by software or applications running on AR-based training system 11 (e.g., AR unit 66) to temporarily store information during program execution.

AR-based training system 11 may utilize communication units 54 to communicate with other systems, e.g., PPEMS 6 of FIG. 1, via one or more networks or via wireless signals. Communication units 54 may be network interfaces, such as Ethernet interfaces, optical transceivers, radio frequency (RF) transceivers, or any other type of devices that can send and receive information. Other examples of interfaces may include Wi-Fi, NFC, or Bluetooth® radios.

UI devices 52 may be configured to operate as both input devices and output devices. For example, UI devices 52 may be configured to receive tactile, audio, or visual input from a user of AR-based training system 11. In addition to receiving input from a user, UI devices 52 may be configured to provide output to a user using tactile, audio, or video stimuli. For instance, UI devices 52 may include a display configured to present the AR display as described herein. For example, a display may include a touchscreen of a computing device, such as a laptop, tablet, smartphone, etc. Other examples of UI devices 52 include any other type of device for detecting a command from a user, a sound card, a video graphics adapter card, or any other type of device for converting a signal into an appropriate form understandable to humans or machines.

Camera 56 (e.g., image capture device 22 of FIG. 1) may be configured to capture still images and/or a video feed. In some examples, camera 56 may be configured to capture the images and/or video feed continuously such that AR-based training system 11 can generate an AR display in real time or near real time. In some cases, camera 56 or an additional camera or sensor may be configured to track or identify a direction of a user's eyes.

Operating system 60 controls the operation of components of AR-based training system 11. For example, operating system 60, in one example, facilitates the communication of UI module 62, telemetry module 64, and AR unit 66 with processors 50, UI devices 52, communication units 54, camera 56, and memory 58. UI module 62, telemetry module 64, and AR unit 66 may each include program instructions and/or data stored in memory 58 that are executable by processors 50. For example, AR unit 66 may include instructions that cause AR-based training system 11 to perform one or more of the techniques described herein.

UI module 62 may be software and/or hardware configured to interact with one or more UI devices 52. For example, UI module 62 may generate audio or tactile output, such as speech or haptic output, to be transmit to a user through one or more UI devices 52. In some examples, UI module 62 may process an input after receiving it from one of UI devices 52, or UI module 62 may process an output prior to sending it to one of UI devices 52.

Telemetry module 62 may be software and/or hardware configured to interact with one or more communication units 54. Telemetry module 62 may generate and/or process data packets sent or received using communication units 54. In some examples, telemetry module 64 may process one or more data packets after receiving it from one of communication units 54. In other examples, telemetry module 64 may generate one or more data packets or process one or more data packets prior sending it via communication units 54.

In the example illustrated in FIG. 3, AR unit 66 includes image capture unit 68, face detection unit 70, alignment unit 72, AR display generation unit 74, and AR database 76. Image capture unit 68 is configured to cause camera 56 to capture at least one image of a user of AR-based training system 11, such as one of workers 10 of FIG. 1. Face detection unit 70 is configured to identify a face of the user from the at least one image captured by camera 56, and extract a set of facial landmarks from the at least one image. Alignment unit 72 is configured to determine a relative alignment between the extracted facial landmarks and a surface or shape of a model of an article of PPE. AR display generation unit 74 is configured to generate AR content based on the determined alignment, such as a composite image or video of the user overlaid with a graphical representation or animation demonstrating correct fit of the article of PPE according to the determined alignment.

AR-based training system 11 may include additional components that, for clarity, are not shown in FIG. 3. For example, AR-based training system 11 may include a battery to provide power to the components of AR-based training system 11. Similarly, the components of AR-based training system 11 shown in FIG. 3 may not be necessary in every example of AR-based training system 11. For example, in some cases, PPEMS 6, communication hubs 13, a mobile device, another computing device, or the like may perform some or all of the techniques attributed to AR unit 66, and thus, in some such examples, AR-based training system 11 may not include AR unit 66.

Figure 4C:
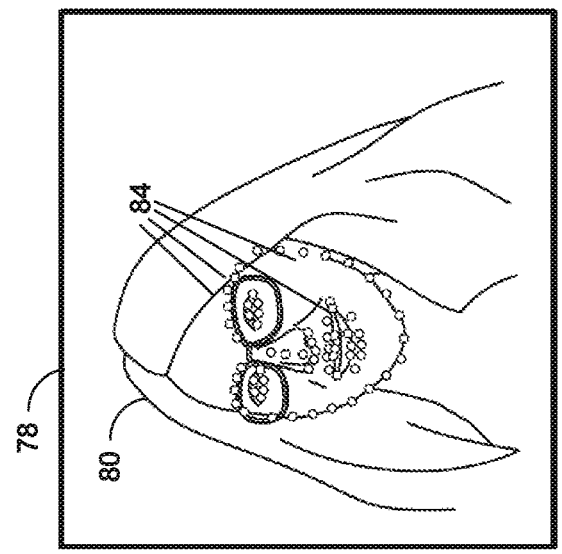
FIGS. 4A-4D are conceptual diagrams depicting a method of fitting a PPE model to an image of a user, in accordance with techniques of this disclosure.
Figure 4B:
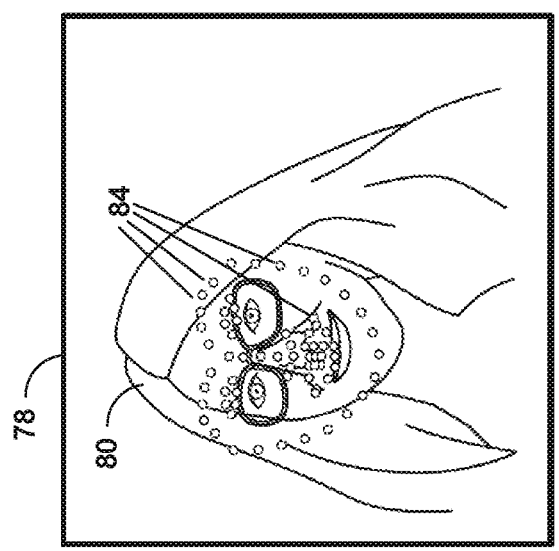
Figure 4A:
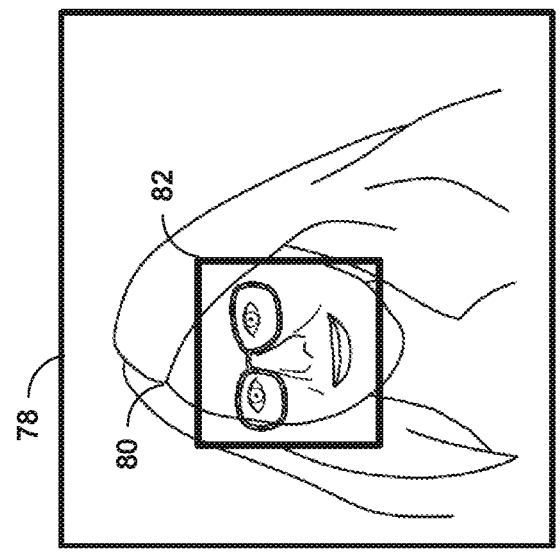

FIGS. 4A-4D are conceptual diagrams depicting an example process performed by AR display device 49 for custom fitting AR content of a particular PPE to an image of a user, scaling, position, rotating and scaling the AR content, in accordance with techniques of this disclosure. As shown in FIG. 4A, an AR-based personal protective equipment training system 11 (FIG. 1), for example, running on a computing device such as a tablet, laptop, smartphone, or other augmented reality display device, captures at least one image 78 of a user 80. User 80 may include an example of one of workers 10 (e.g., worker 10A) of FIG. 1, user 20 of FIG. 1, remote user 24 of FIG. 1, or any other user of AR-based training system 11. For example, AR-based training system 11 may include an image capture unit 68 (FIG. 3) configured to cause a camera 56 or other image capture device 22 (FIGS. 1 and 2) to capture a still image 78, a series of images, a video segment, or a continuous live video feed. AR-based training system 11 (e.g., image analyzer 40C of FIG. 2 and/or face detection unit 70 of FIG. 3) may then apply face detection software or other algorithms to locate a face 82 of user 80 within the at least one image 78. Some non-limiting examples of face detection algorithms may include an adaptive boosting (AdaBoost) algorithm with Haar wavelets; a histogram of oriented gradients (HOG) based detection; or a deep neural network (DNN) algorithm. There are numerous feature matching algorithms in the Computer Vision literature. Such algorithms can be used to locate an object in an image, regardless of the scale or orientation of the object, by discovering keypoints in the image. Each keypoint may have an associated descriptor. Through the discovery of these keypoints, the location, orientation and scale of the object may be revealed. In some embodiments, these keypoints and descriptors can be used to locate facial features (e.g. the eyes, nose, or mouth) in an image of the face. With the location, orientation and scale of the facial feature now known, an image of the desired PPE (e.g. a disposable respirator) can be located, oriented and scaled relative to that facial feature, in accordance with the AR aspects of the present invention. Examples of keypoint detectors include (but are not limited to) the following models: the Scale-Invariant Feature Transform (SIFT), Speeded-Up Robust Features (SURF), Oriented FAST and rotated BRIEF (ORB), Binary Robust Invariant Scalable Keypoints (BRISK), Features from Accelerated Segment Test (FAST), KAZE Features, A-KAZE features, the Harris corner detector, Multi-Scale Oriented Patches (MOPs), the Laplacian of Gaussian (LoG) Filter, and Maximally stable extremal regions (MSER). Examples of descriptors include (but are not limited to) the following models: SIFT, SURF, M-SURF, BRISK, ORB, Histogram of Oriented Gradients (HOG), Gradient Location and Orientation Histogram (GLOH), Local Energy-based Shape Histogram (LESH), Fast Retina Keypoint (FREAK), and Local Difference Binary (LDB). Implementations of many of these keypoint detectors and the associated descriptors can be found in the open source Computer Vision library OpenCV.

As shown in FIG. 4B, once AR-based training system 11 has identified a face 82 of user 80 within image 78, AR-based training system 11 may apply one or more additional algorithms to extract or identify a set of facial landmarks 84 representing unique feature points of the user's face 80, such as edges, facial features (e.g., eyes, nose, mouth), contours, or other features. AR-based training system 11 may initially place facial landmarks 84 on the user's face 82 in an approximate position based on the location of identified face 82. For example, AR-based training system 11 may initially place facial landmarks 84 according to an average location of each landmark on each face across a set of training data comprising a series of images of faces. One non-limiting example of a set of facial landmark training data is the "dlib" library found at http://dlib.net/. As shown in FIG. 4C, AR-based training system 11 may then apply an iterative algorithm to more-accurately fit facial landmarks 84 to correct locations on the user's face within image 78. For example, AR-based training system 11 may train a deformable part model (DPM) to extract the plurality of landmarks and place the plurality of landmarks on the face of the worker.

Figure 4D:
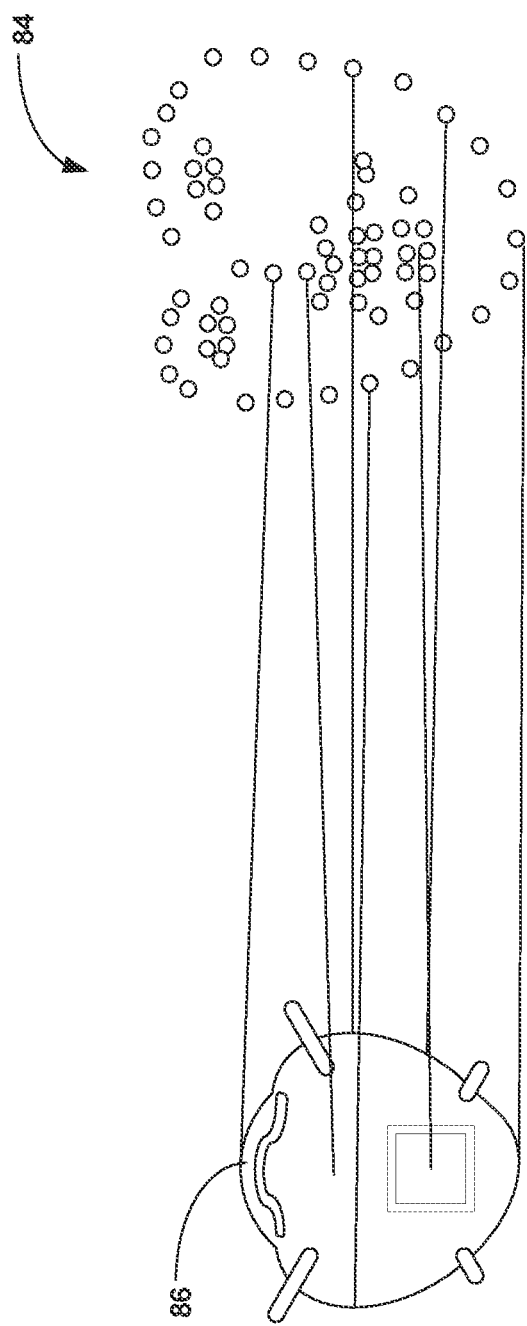

As shown in FIG. 4D, AR-based training system 11 (e.g., alignment unit 72 of FIG. 3) may then align or fit facial landmarks 84 to a digital PPE model 86, for example, a digital model of an article of PPE, such as PPE 13. For example, PPE model 86 may include a 2D or 3D graphical representation 86 of an article of PPE 13 either identified by AR-based training system 11 or selected by user 80. For example, AR-based training system 11 may apply one or more algorithms to reduce an error between a relative position of each of facial landmarks 84 and one or more shapes, contours, edges, and/or surfaces of PPE model 86. For example, AR-based training system 11 may rotate, translate, and/or scale either or both of facial landmarks 84 and PPE model 86 to determine a relative fit or alignment between the two datasets. AR-based training system 11 may store an indication of the determined relative alignment, such as a relative orientation (e.g., translation and/or rotation) and/or a relative scale between the facial landmarks and the digital model. Although depicted in FIG. 4D as a complete graphical representation of PPE 13, in some examples, digital model 86 may include a 3D point cloud defining an exterior shape or surface of PPE 13.

Figure 5A:
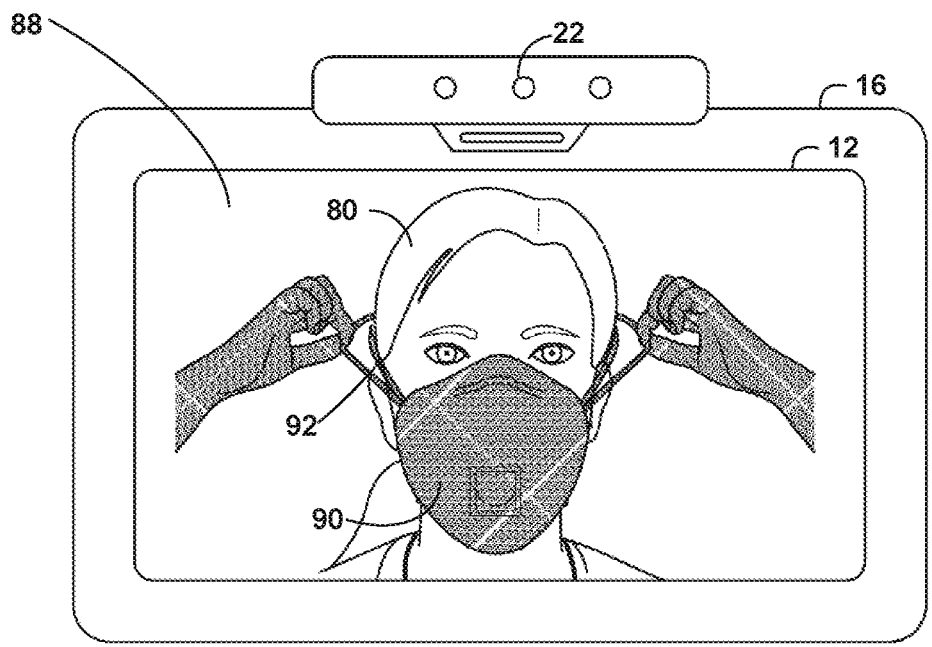
FIGS. 5A and 5B are example graphical user interfaces (GUIs) including AR content, in accordance with techniques of this disclosure.
Figure 5B:
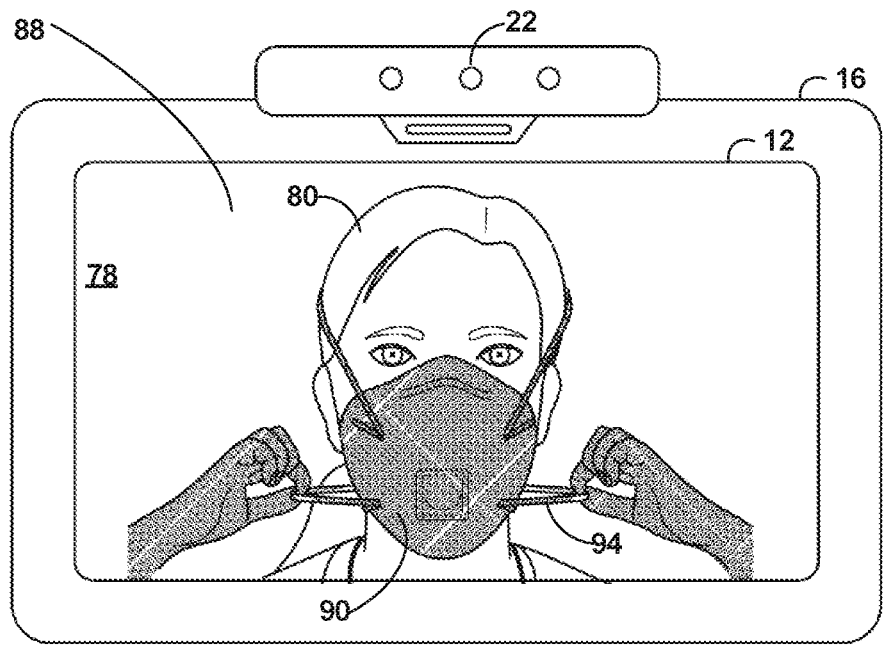

Once AR-based training system 11 has determined a relative alignment between facial landmarks 84 and PPE model 86, AR-based training system 11 (e.g., AR unit 40D of FIG. 2 and/or AR display generation unit 74 of FIG. 3) may generate and output for display AR content simulating a correct fit of PPE 13 to user 80. For example, as shown in FIGS. 5A and 5B, AR-based training system 11 may generate and output AR content 88 on display 12 of computing device 16. In some examples, AR content 88 may include a composite image or video including the original image or video 78 overlaid with additional graphical content. In other examples, AR content 88 may include an avatar of user 80 overlaid with additional graphical content. In other examples, AR content 88 may include another image of a person, such as a celebrity, cartoon character, or the like, overlaid with additional graphical content.

In the example shown in FIGS. 5A and 5B, AR content 88 includes the original image 78 of user 80 overlaid with an animation sequence demonstrating correct fit of a respirator mask, wherein the animation sequence is aligned to the face 82 of user 80 according to the determined alignment. For example, FIGS. 5A and 5B depict a photorealistic image 78 of user 80, overlaid with an animation 90 of a respirator mask and animated hands and arms instructing user 80 to secure an upper strap 92 of the respirator mask (FIG. 5A) before securing a lower strap 94 of the respirator mask (FIG. 5B). In turn, user 80 may mimic or mirror the animation 90 displayed on display 12 in order to correctly fit his or her own corresponding article of PPE 13 (FIGS. 6A-6C).

In other examples, animation 90 may demonstrate additional, fewer, or different steps of a procedure for correct PPE fit. For example, animation sequence 90 may include a pair of cartoon or photorealistic hands demonstrating or simulating various PPE fit steps such as (as non-limiting examples) removing the respirator mask from packaging; positioning the respirator mask in a correct location on a face of the worker in accordance with the determined alignment; positioning straps of the respirator mask; forming a nose clip of the respirator mask; performing a fit check of the respirator mask (e.g., covering a filter of the respirator mask and inhaling to identify leak paths); and/or donning the respirator mask in a sequential order relative to at least one other article of PPE.

Figure 6A:
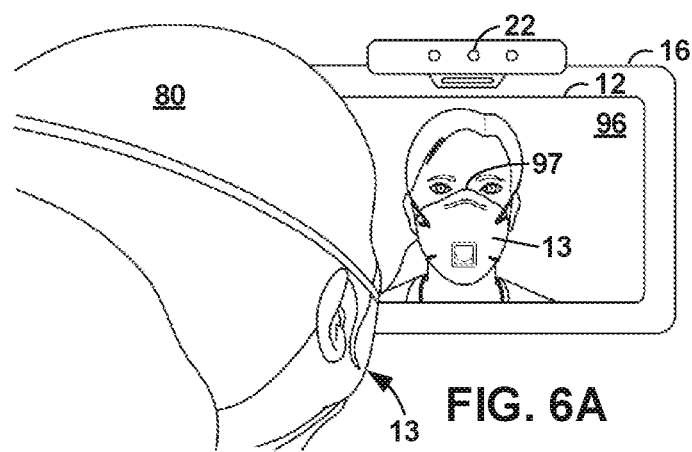
FIGS. 6A-6C are conceptual diagrams including further example GUIs, in accordance with techniques of this disclosure.
Figure 6B:
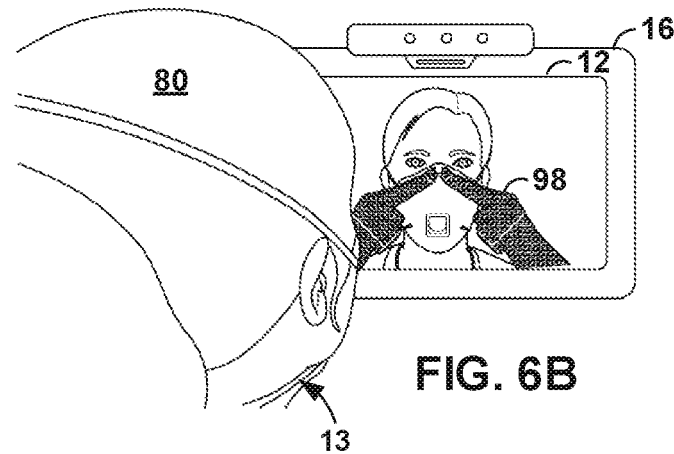
Figure 6C:
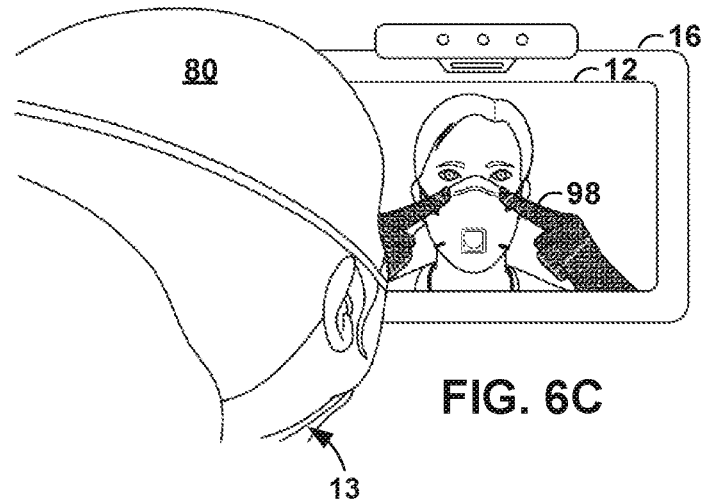

FIGS. 6A-6C are conceptual diagrams including additional examples of graphical user interfaces (GUIs) of an AR-based PPE training system 11. In some examples in accordance with this disclosure, AR-based training system 11 may be configured to determine whether user 80 is wearing an article of PPE 13 correctly. As shown in FIG. 6A, AR-based training system 11 may cause image capture device 22 to capture an image 96 depicting user 80 wearing an article of PPE 13. In some examples, AR-based training system 11 may output image 96 for display on display 12 of computing device 16. AR-based training system 11 may then process image 96 according to the techniques described above to determine whether the article of PPE 13 is correctly fit on user 80. In some examples, AR-based training system 11 may determine a correct fit of PPE 13 by comparing an alignment between PPE 13 and user 80 within image 96 to the previously determined alignment of facial landmarks 84 to PPE model 86, which may be stored in memory 58 (FIG. 3).

Figure 7:
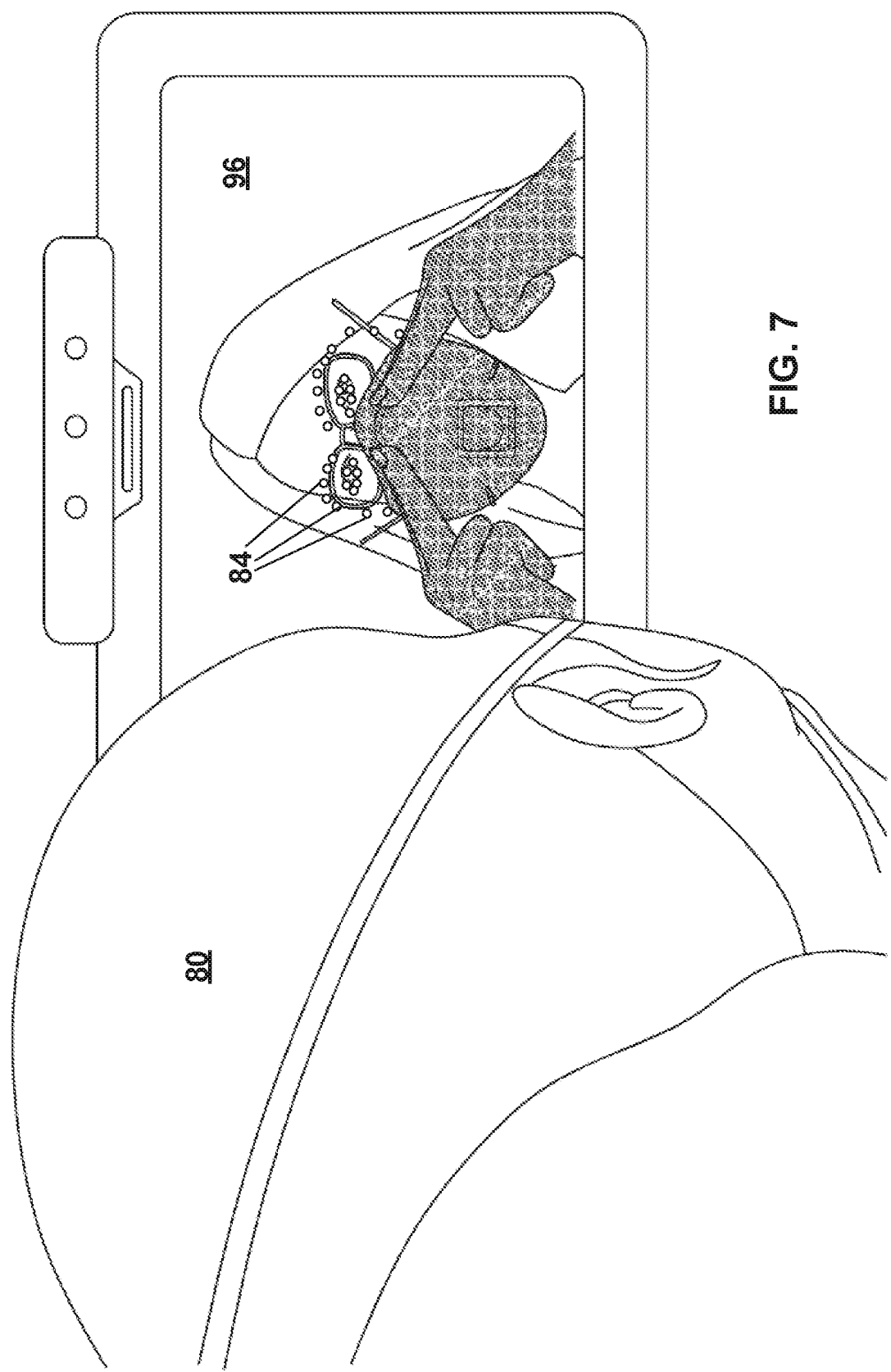
FIG. 7 is a conceptual diagram including another example GUI, in accordance with techniques of this disclosure.

In another example, AR-based training system 11 may be configured to determine whether a current PPE fit is correct by comparing image 96 to a previous fit-test image of user 80 stored in memory. In another example, AR-based training system 11 may determine whether a current PPE fit is correct by using a depth camera to generate a 3D model simulating a current geometry (e.g., shape) of PPE 13 and compare the geometry of PPE 13 to the previously extracted facial landmarks 84 to determine whether corresponding contours match or align within a threshold tolerance. In another example, as shown in FIG. 7, AR-based training system 11 may identify any facial landmarks 84 visible within image 96 (e.g., landmarks not occluded by PPE 13) and evaluate a position of landmarks 84 relative to a position of PPE 13 visible within image 96. As one non-limiting example, AR-based training system 11 may identify an outer edge or perimeter 97 of the respirator mask within image 96 and determine whether the edge 97 is a "correct" distance (e.g., within a threshold window) from landmarks 84 indicating the user's eyes.

In some examples, AR-based training system 11 may determine, using any or all of the above-described techniques, that PPE 13 is not correctly fit onto user 80. In such examples, AR-based training system 11 (e.g., notification service 40F of FIG. 2) may output a notification to inform user 80 of the incorrect alignment. In other examples, such as shown in FIGS. 6B and 6C, AR-based training system 11 may automatically generate user-specific and PPE-specific AR content 98 demonstrating actions for user 80 to perform to correct the fit of PPE 13. In the example depicted in FIGS. 6B and 6C, AR-based training system 11 has determined that a current shape of a nose clip of the respirator does not conform to the contours of the user's face. Accordingly, AR content 98 includes image 96 overlaid with an animation sequence simulating and/or instructing user 80 how to form a nose clip of her respirator mask 13 by running her fingers along an upper edge 97 of the mask 13.

In some examples, AR-based training system 11 may "gamify" the AR content, such that the animation sequence comprises an interactive game instructing user 80 how to interact with the article of PPE through interactions with the AR elements. For example, AR-based training system 11 may output for display an indication of specific areas of the animated PPE 13, wherein the user may gain points by using her fingers to touch the corresponding areas on her own PPE 13.

Figure 8:
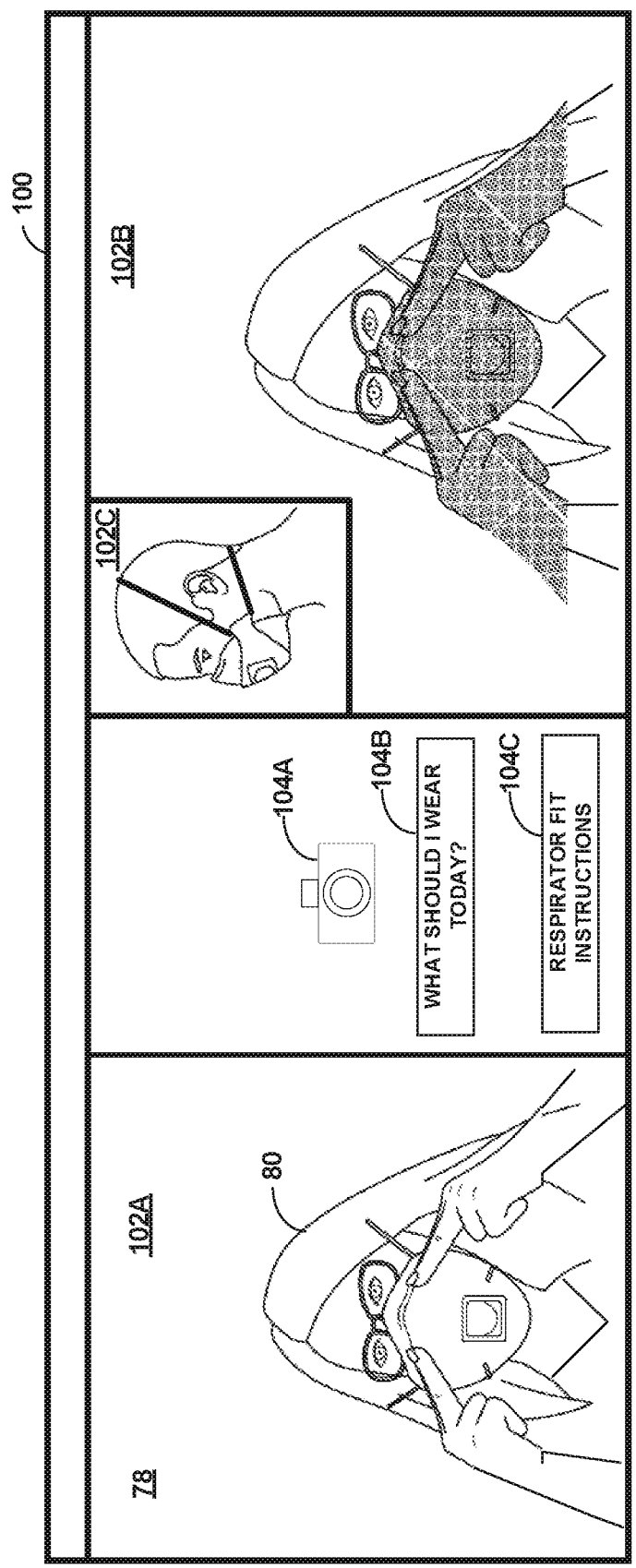
FIG. 8 is an example GUI, in accordance with techniques of this disclosure.

FIG. 8 is another example GUI 100 that AR-based training system 11 may generate and output for display, in accordance with techniques of this disclosure. GUI 100 includes display windows 102A-102D (collectively, "windows 102") and input widgets 104A-104C (collectively, "widgets 104").

A user 80 may approach a computing device 16 (FIG. 1), such as a laptop, tablet, mobile phone, or other computing device, wherein GUI 100 is displayed on a display screen (e.g., a touchscreen) of computing device 16. User 80 may actuate input widget 104A, thereby providing user input to AR-based training system 11 to cause an image capture device 22 (e.g., a camera) of computing device 16 to capture at least one image 78 of user 80. In some examples, image 78 may include a single still image. In other examples, image 78 may include a continuous live video feed. In other examples, image 78 may include a video segment, such as a short video clip (e.g., about 5 to 10 seconds).

As shown in FIG. 8, AR-based training system 11 may output image 78 for display in window 102A. For example, window 102A may display the still image 78 of user 80, a live video feed of user 80, or a looped video segment of user 80. User 80 may then actuate input widget 104B, thereby providing user input prompting AR-based training system 11 to output for display a list of different types of personal protective equipment (PPE). The user may select one or more articles or items of PPE from the list.

User 80 may actuate (e.g., touch or press) input widget 104C, thereby providing user input to prompt PPEMS 6 to generate and output for display augmented reality content in window 102B and/or window 102C, including a simulation configured to instruct user 80 how to don, put on, or otherwise wear the one or more selected items of PPE as selected by user 80. For example, AR-based training system 11 may retrieve AR content from memory and align the AR content to a face of the user, and then output for display in window 102B a composite image or video of user 80 overlaid with the AR content.

In some examples, the simulation may include an animated training sequence. For example, the training sequence may include a video or sequence of rendered images depicting an article of PPE (e.g., a respirator mask) and a pair of animated hands demonstrating how to put on the PPE.

In some examples, the training sequence may include at least one 2D image, or a "sketch" of the article of PPE as shown from a single orientation. For example, AR-based training system 11 may determine an orientation or pose of the head of user 80 within image 78. AR-based training system 11 may further store a database of 2D sketches of the article of PPE are sketched or photographed from different angles or orientations. AR-based training system 11 may then retrieve from memory (e.g., the database) a single 2D image of the article of PPE corresponding to the orientation of the user's head. If user 80 moves her head, AR-based training system 11 may retrieve from memory a new PPE sketch corresponding (e.g., more similar to) the new head orientation.

In the example of FIG. 8, GUI 100 includes a split-screen image having at least two windows 102A and 102B. Window 102A may display the original image 78 of user 80 as captured by image capture device 22, for example, without additional AR content overlaid. Meanwhile, window 102B may display AR content, such as the same image 78 displayed in window 102A, overlaid with an aligned AR training sequence. In this way, user 80 may watch or observe themselves in the first window 102A as they mimic or mirror the actions of the simulation in the second window 102B, in order to improve PPE compliance.

In some examples, AR-based training system 11 may update the AR content in real-time. For example, in examples in which image 78 includes a live video feed and the AR content includes a 3D PPE model, as user 80 moves her head, AR-based training system 11 may update the AR content to move with (e.g., follow) the user's head, as if fixed to the user in reality.

In some examples, AR-based training system 11 may generate AR content including a 3D model of the head of user 80. For example, using an RGB camera with an infrared (IR) depth sensor, AR-based training system 11 may generate a 3D model of the user's head based on captured images of the head in different orientations. In such examples, AR-based training system 11 may align the PPE fit simulation to the 3D model of the user's head and output the generated content to windows 102B and/or 102C. In some examples, GUI 100 may include an additional input widget (not shown) enabling the user to toggle between a real-time video overlaid with a 3D PPE model and a static image overlaid with a 2D PPE sketch.

In some examples, GUI 100 includes a third window 102C. Window 102C may display a PPE-fit simulation from a different perspective as window 102B. For example, as shown in FIG. 8, third window 102C displays a side-view of the PPE fit instructions, so that user 80 may better view a placement of top strap 92 and bottom strap 94.

In some examples, AR-based training system 11 is configured to actively monitor (via image capture device 22) any actions performed by user 80 and provide feedback on the user's actions. For example, AR-based training system 11 may process data captured by image capture device 22 in real-time to confirm that the actions of user 80 correspond to procedures indicated by the AR training sequence displayed in window 102B and/or 102C. For example, AR-based training system 11 may output a notification or indication, such as a green light or other affirmation, to indicate that user 80 is correctly following the AR instructions. AR-based training system 11 may output another notification or indication, such as a red light or "X" mark, to indicate that user 80 is incorrectly following the AR instructions.

Once user 80 is wearing the article of PPE, AR-based training system 11 may be configured to determine whether user 80 is wearing the PPE correctly. In one example, AR-based training system 11 may use algorithms to detect both the article of PPE and any visible facial landmarks (e.g., even when a respirator is worn), and compare the current alignment between the PPE and the facial landmarks to the previously determined alignment between the user's facial landmarks and the PPE model. In another example, such as when image capture device 22 includes a depth camera, AR-based training system 11 may analyze a current the 3D structure of the respirator and compare the current 3D structure to the landmarks on the user's face. For example, AR-based training system 11 may be able to determine that a current shape of a nose clip of the respirator does not conform to the contours of the user's face, as indicated by the previously identified facial landmarks, and therefore predict that the nose clip is unlikely to adhere to the user's face. In these examples, AR-based training system 11 may retrieve from memory and output for display a particular subsection of the AR training sequence, such as a subsection instructing user 80 how to correctly form the nose clip. As another example, AR-based training system 11 may identify that a top strap 92 (FIG. 5A) is not correctly placed on the user's head. In such examples, AR-based training system 11 may retrieve from memory and output for display a subsection of the AR training sequence instructing user 80 where to place top strap 92, as shown in FIG. 5A.

In another example of the techniques of this disclosure, AR-based training system 11 may implement algorithms based on a Generative Adversarial Network (GAN). A GAN describes a set of algorithms which can generate images based on a database of previous images. In the present case, AR-based training system 11 may include a GAN to train two networks. One network would act as a classifier, which would predict whether an image, such as the image appearing in window 102A, looks like an image of a person wearing a respirator mask (or other article of PPE). The second network may take an image of user 80 and generate a picture of user 80 wearing a respirator mask (or other article of PPE). Both networks would are then be trained in conjunction, so that the classifier network is able to determine "good" examples created by the generative network, indicative of a correct PPE fit or positive PPE compliance.

In some examples, such as when user 80 selects more than one article of PPE from the selection menu, AR-based training system 11 may be configured to customize the AR training sequence to display a correct order for user 80 to place each article of PPE on her body. For example, if user 80 selects both a respirator mask and eye protection, AR-based training system 11 may customize the AR training sequence to instruct user 80 to place the respirator mask before the eye protection, so that the eye protection does not prevent the respirator from forming a tight seal with the user's face. In some examples, AR-based training system 11 may output an ordered list of the articles of PPE to wear (e.g., indicating the correct order to place them), such that the user may select each item from the ordered list in order to display the corresponding training sequence for that item. A correct order to place items of PPE is discussed further in commonly assigned U.S. Provisional Patent Application No. 62/674,429, incorporated herein by reference in its entirety.

Figure 9:
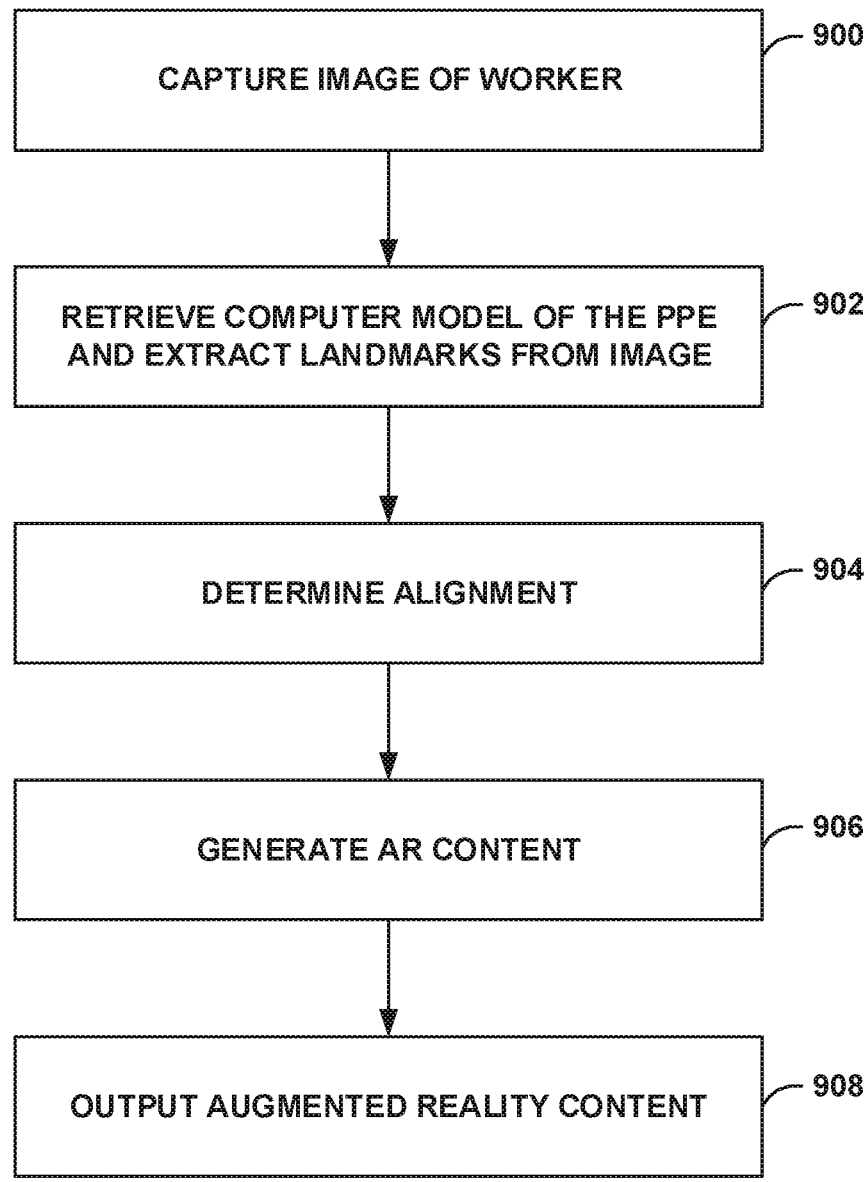
FIG. 9 is a flow diagram illustrating an example technique for training a user to correctly fit one or more articles of PPE, according to aspects of this disclosure.

FIG. 9 is a flowchart illustrating an example technique for verifying one or more articles of PPE worn by a worker in an image with one or more articles of PPE identified for a worker to use, according to aspects of this disclosure. The techniques of FIG. 9 are described with respect to personal protective equipment simulation system (PPEMS) 6 of FIGS. 1-3, however, any adequate system or device(s) may perform the techniques herein. AR-based training system 11 running on a computing device 16 causes an image capture device 22 to capture at least one image or a video of a user 10 of AR-based training system 11 and/or of the computing device 16 (900). AR-based training system 11 determines at least one article of PPE 13 to simulate for the user. For example, AR-based training system 11 may determine PPE 13 based on an identity of user 10, or based on user input received from user 10. Based on the determined article(s) of PPE 13, AR-based training system 11 retrieves from memory a 2D or 3D model 86 (FIG. 4D) of the PPE 13. In examples, in which PPE 13 is intended to be worn on a face of user 10, AR-based training system 11 may perform face detection on the at least one image or video of user 10 in order to identify a set of facial landmarks 84 (902).

AR-based training system 11 may determine an alignment between PPE model 86 and extracted facial landmarks 84, so as to reduce an error between a shape or surface of PPE model 86 and a relative position of each of facial landmarks 84 (904).

Based on the determined alignment, AR-based training system 11 may generate user-specific and PPE-specific AR content simulating or demonstrating a correct fit of PPE 13 to user 10 (906). AR-based training system 11 may generate the dynamically customized AR content such that a graphical representation of a particular article of PPE is uniquely positioned or oriented relative to user-specific features within the image of the user so as to provide a highly accurate simulation of the proper fit of the article of PPE to the particular user. For example, AR-based training system 11 may generate a composite image of the original image or video of user 10 precisely overlaid (e.g., aligned) with a graphical representation of PPE 13, such as the 2D or 3D PPE model 86. In some examples, the graphical representation may include an animation sequence demonstrating a procedure to correctly fit the article of PPE 13. AR-based training system 11 may then output the generated AR content for display, such as to a display screen 12 of a computing device 16, such that user 10 may mimic or mirror the AR simulation of the PPE fit (908).

Figure 10:
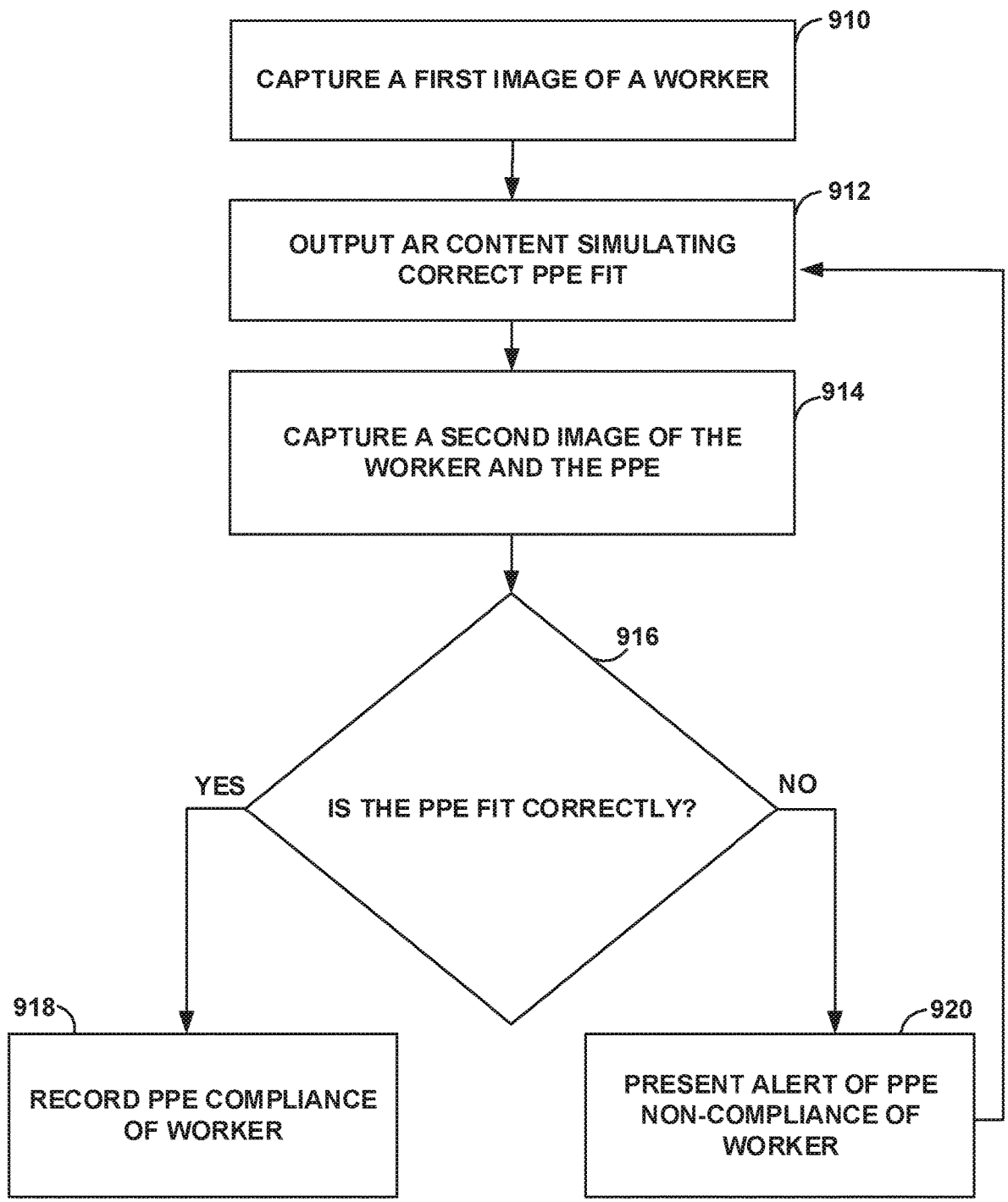
FIG. 10 is a flow diagram illustrating an example technique for verifying a correct fit of one or more articles of PPE, according to aspects of this disclosure.

FIG. 10 is a flow diagram illustrating another example technique for verifying one or more articles of PPE worn by a worker in an image with one or more articles of PPE identified for a worker to use for a confined space environment, according to aspects of this disclosure. The techniques of FIG. 10 are described with respect to AR-based training system 11 of FIGS. 1-3, however, any adequate system or device(s) may perform the techniques herein. AR-based training system 11 miming on a computing device 16 causes an image capture device 22 to capture at least one image or a video of a user 10 of AR-based training system 11 and/or of the computing device 16 (910). AR-based training system 11 may then generate and output AR content simulating a correct fit of one or more articles of PPE 13 to user 10 (912). For example, AR-based training system 11 may determine an alignment between a model 86 of PPE 13 and a set of extracted landmarks within the image of user 10. AR-based training system 11 may then generate AR content, such as a composite image or video based on the determined alignment.

After a predetermined period of time (e.g., a sufficient amount of time for user 10 to done PPE 13), AR-based training system 11 may capture a second image or video of worker 10 wearing PPE 13 (914). Based on the second image or video, as well as the previously determined alignment, AR-based training system 11 may determine whether user 10 is correctly wearing PPE 13 (916). For example, AR-based training system 11 may compare the second image or video of user 10 to the previously determined correct alignment, to determine whether a measured error within the second image or video falls within a threshold value or set of values from the determined correct alignment. In another example, AR-based training system 11 may compare one or more visual features of the second image to one or more visual features of a previous fit-test image, as detailed further in commonly assigned U.S. Provisional Patent Application No. 62/674,438, incorporated herein by reference in its entirety.

If AR-based training system 11 determines that user 10 is correctly wearing PPE 13 ("YES" of 916), AR-based training system 11 may record a positive compliance value for user 10 (918). If AR-based training system 11 determines that user 10 is incorrectly wearing PPE 13 ("NO" of 916), AR-based training system 11 may generate and output an alert or other notification of PPE non-compliance to user 10 (920). In some examples, AR-based training system 11 may store an indication of the incorrect placement and/or update a safety record of the worker stored in memory based on the incorrect placement. For example, AR-based training system 11 (e.g., record management service 40H of FIG. 2) may observe user 10 as they are correctly fitting the PPE 13 according to the instructions detailed in the simulation. AR-based training system 11 may digitize the observations could be digitized to show whether the user chose to follow the instructions being shown. These digitized observations may be used to demonstrate compliance auditing at a later date, or could be used to provide further personalized instructions in the case where the user makes a mistake in correctly fitting the PPE. For example, AR-based training system 11 may generate and output for display additional or updated AR content, for example, simulating or demonstrating a process of corrective action for user 10 to correct their PPE fit (912).

Although the methods and systems of the present disclosure have been described with reference to specific examples, those of ordinary skill in the art will readily appreciate that changes and modifications may be made thereto without departing from the spirit and scope of the present disclosure.

In the present detailed description, reference is made to the accompanying drawings, which illustrate specific examples. The illustrated examples are not intended to be exhaustive of all examples according to the disclosure. It is to be understood that other examples may be utilized and structural or logical changes may be made without departing from the scope of the present disclosure. The following detailed description, therefore, is not to be taken in a limiting sense, and the scope of the present disclosure is defined by the appended claims.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein.

As used in this specification and the appended claims, the singular forms "a," "an," and "the" encompass examples having plural referents, unless the content clearly dictates otherwise. As used in this specification and the appended claims, the term "or" is generally employed in its sense including "and/or" unless the content clearly dictates otherwise.

Spatially related terms, including but not limited to, "proximate," "distal," "lower," "upper," "beneath," "below," "above," and "on top," if used herein, are utilized for ease of description to describe spatial relationships of an element(s) to another. Such spatially related terms encompass different orientations of the device in use or operation in addition to the particular orientations depicted in the figures and described herein. For example, if an object depicted in the figures is turned over or flipped over, portions previously described as below or beneath other elements would then be above or on top of those other elements.

As used herein, when an element, component, or layer for example is described as forming a "coincident interface" with, or being "on," "connected to," "coupled with," "stacked on" or "in contact with" another element, component, or layer, it can be directly on, directly connected to, directly coupled with, directly stacked on, in direct contact with, or intervening elements, components or layers may be on, connected, coupled or in contact with the particular element, component, or layer, for example. When an element, component, or layer for example is referred to as being "directly on," "directly connected to," "directly coupled with," or "directly in contact with" another element, there are no intervening elements, components or layers for example.

The techniques of this disclosure may be implemented in a wide variety of computer devices, such as servers, laptop computers, desktop computers, notebook computers, tablet computers, hand-held computers, smart phones, and the like. Any components, modules or units have been described to emphasize functional aspects and do not necessarily require realization by different hardware units. The techniques described herein may also be implemented in hardware, software, firmware, or any combination thereof. Any features described as modules, units or components may be implemented together in an integrated logic device or separately as discrete but interoperable logic devices. In some cases, various features may be implemented as an integrated circuit device, such as an integrated circuit chip or chipset. Additionally, although a number of distinct modules have been described throughout this description, many of which perform unique functions, all the functions of all of the modules may be combined into a single module, or even split into further additional modules. The modules described herein are only exemplary and have been described as such for better ease of understanding.

If implemented in software, the techniques may be realized at least in part by a computer-readable medium comprising instructions that, when executed in a processor, performs one or more of the methods described above. The computer-readable medium may comprise a tangible computer-readable storage medium and may form part of a computer program product, which may include packaging materials. The computer-readable storage medium may comprise random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The computer-readable storage medium may also comprise a non-volatile storage device, such as a hard-disk, magnetic tape, a compact disk (CD), digital versatile disk (DVD), Blu-ray disk, holographic data storage media, or other non-volatile storage device.

The term "processor," as used herein may refer to any of the foregoing structure or any other structure suitable for implementation of the techniques described herein. In addition, in some aspects, the functionality described herein may be provided within dedicated software modules or hardware modules configured for performing the techniques of this disclosure. Even if implemented in software, the techniques may use hardware such as a processor or processing circuitry to execute the software, and a memory to store the software. In any such cases, the computers described herein may define a specific machine that is capable of executing the specific functions described herein. Also, the techniques could be fully implemented in one or more circuits or logic elements, which could also be considered a processor.

Various examples have been described. These and other examples are within the scope of the following claims.

What is claimed is:

1. A personal protective equipment (PPE) training system comprising:
    an image capture device; and
    a computing device communicatively coupled to the image capture device, the computing device comprising one or more computer processors and a memory, the memory including instructions that when executed by the one or more computer processors cause the one or more computer processors to:
        simulate a fitting of a personal protective equipment (PPE) article to a worker by:
        controlling the image capture device to capture at least a first image of the worker;
        selecting a digital model of the PPE article;
        determining an alignment of the digital model of the PPE article to the first image of the worker; and
        outputting for display augmented reality content comprising a composite of a least a second image of the worker overlaid with the digital model of the PPE article in accordance with the determined alignment, wherein the digital model comprises an animation sequence demonstrating correct placement of the PPE article;
        wherein the PPE article comprises a respirator mask, and wherein the animation sequence demonstrates performing a fit check of the respirator mask, wherein performing the fit check comprises covering a filter of the respirator mask and inhaling to identify leak paths.

2. The PPE training system of claim 1, wherein determining the alignment comprises:
    implementing a face detection module to detect a face of the worker within the first image;
    extracting a plurality of feature points from the face of the worker; and
    aligning the digital model of the PPE article to the plurality of feature points.

3. The PPE training system of claim 2, wherein aligning the digital model comprises determining a scale of the digital model and an orientation of the digital model so as to reduce an error between the digital model and the plurality of feature points.

4. The PPE training system of claim 2, wherein the face detection module comprises:
    an adaptive boosting (AdaBoost) algorithm with Haar wavelets;
    an Oriented FAST and rotated BRIEF (ORB) based technique;
    a histogram of oriented gradients (HOG) based detection; or
    a deep neural network (DNN) algorithm.

5. The PPE training system of claim 2, wherein extracting the plurality of feature points comprises training a deformable parts model to place the plurality of feature points on the face of the worker.

6. The PPE training system of claim 1, wherein the second image of the worker comprises the first image of the worker.

7. The PPE training system of claim 1, wherein the second image comprises an avatar of the worker.

8. The PPE training system of claim 1, wherein the first image comprises a live video, and wherein the second image comprises the live video.

9. The PPE training system of claim 1, wherein the digital model comprises a 3D point cloud representing the PPE article.

10. The PPE training system of claim 1, wherein selecting the digital model of the PPE comprises first determining which PPE article is likely to successfully fit the worker, based on the first image.

11. The PPE training system of claim 1, wherein selecting the digital model of the PPE comprises first determining which PPE article is likely to successfully fit the worker, based on fit test data for the worker stored in a database.

12. The PPE training system of claim 1, wherein the animation sequence further demonstrates:
   removing the respirator mask from packaging;
   positioning the respirator mask in a correct location on a face of the worker in accordance with the determined alignment;
   positioning straps of the respirator mask;
   forming a nose clip of the respirator mask; or
   donning the respirator mask in a sequential order relative to at least one other article of PPE.

13. The PPE training system of claim 12, wherein the animation sequence comprises a pair of cartoon hands demonstrating the correct placement.

14. The PPE training system of claim 1, wherein the instructions are further configured to:
   cause the image capture device to capture at least a third image of the worker; and
   determine, based on the at least the third image, an incorrect placement of the PPE article.

15. The PPE training system of claim 14, wherein determining the incorrect placement comprises comparing the third image to the determined alignment between the digital model and the first image.

16. The PPE training system of claim 14, wherein determining the incorrect placement comprises comparing the third image to a fit test image stored in memory.

17. The PPE training system of claim 14, wherein the instructions are further configured to:
   output an indication of the incorrect placement;
   determine a corrective action; and
   output an indication of the corrective action.

18. The PPE training system of claim 14, wherein the instructions are further configured to:
   store an indication of the incorrect placement; or
   update a safety record of the worker stored in memory based on the incorrect placement.

* * * * *